United States Patent
van Groenestijn

(10) Patent No.: US 9,817,143 B2
(45) Date of Patent: Nov. 14, 2017

(54) METHODS AND SYSTEMS FOR CONSTRAINING MULTIPLES ATTENUATION IN SEISMIC DATA

(71) Applicant: PGS Geophysical AS, Oslo (NO)

(72) Inventor: Gert-Jan Adriaan van Groenestijn, Voorschoten (NL)

(73) Assignee: PGS Geophysical AS, Oslo (NO)

( * ) Notice: Subject to any disclaimer, the term of this patent is extended or adjusted under 35 U.S.C. 154(b) by 649 days.

(21) Appl. No.: 14/183,236

(22) Filed: Feb. 18, 2014

(65) Prior Publication Data

US 2015/0185342 A1 Jul. 2, 2015

Related U.S. Application Data

(60) Provisional application No. 61/897,518, filed on Oct. 30, 2013.

(51) Int. Cl.
*G01V 1/28* (2006.01)
*G01V 1/36* (2006.01)
*G01V 1/38* (2006.01)

(52) U.S. Cl.
CPC ............ *G01V 1/364* (2013.01); *G01V 1/28* (2013.01); *G01V 1/38* (2013.01); *G01V 2210/56* (2013.01); *G01V 2210/67* (2013.01)

(58) Field of Classification Search
CPC ...... G01V 1/364; G01V 1/38; G01V 2210/56; G01V 1/3808; G01V 1/36; G01V 2210/04; G01V 1/28; G01V 1/282; G01V 2210/67
See application file for complete search history.

(56) References Cited

U.S. PATENT DOCUMENTS

| | | | |
|---|---|---|---|
| 5,682,357 A | 10/1997 | Rigsby | |
| 6,112,155 A * | 8/2000 | Pham | G01V 1/364 702/14 |
| 6,763,304 B2 | 7/2004 | Schonewille | |
| 6,807,488 B2 | 10/2004 | van Borselen | |
| 7,123,543 B2 | 10/2006 | Vaage et al. | |
| 7,336,561 B2 | 2/2008 | Borresen | |
| 7,359,283 B2 | 4/2008 | Vaage et al. | |
| 7,505,361 B2 | 3/2009 | Sollner | |
| 7,675,812 B2 | 3/2010 | Ferris | |
| 7,684,281 B2 | 3/2010 | Vaage et al. | |
| 7,835,225 B2 | 11/2010 | Sollner et al. | |

(Continued)

OTHER PUBLICATIONS

Huo et al., Improving adaptive subtraction in seismic multiple attenuation, Aug. 2009, Geophysics, pp. 59-67.*

(Continued)

*Primary Examiner* — John Breene
*Assistant Examiner* — Mohammad Islam

(57) ABSTRACT

Systems and methods for attenuating multiples in seismic data are presented. In one aspect, predicted surface-related multiples are calculated for seismic data generated by receivers in a marine survey. Estimates of primaries and multiples may be calculated by applying adaptive subtraction to the predicted surface-related multiples. Residual multiples present in the estimated primaries may be identified using multiple diffraction reduction. The residual multiples and estimated multiples are used to generate final estimated multiples that are subtracted from the seismic data to generate primaries with attenuated multiples.

30 Claims, 14 Drawing Sheets

(56) References Cited

U.S. PATENT DOCUMENTS

| | | | |
|---|---|---|---|
| 8,208,342 B2 | 6/2012 | Kluver et al. | |
| 8,315,124 B2 * | 11/2012 | Zhu | G01V 1/364 367/38 |
| 8,339,896 B2 * | 12/2012 | van Borselen | G01V 1/362 367/24 |
| 8,634,271 B2 * | 1/2014 | Sablon | G01V 1/36 367/24 |
| 2008/0294346 A1 * | 11/2008 | Nemeth | G01V 1/364 702/17 |
| 2010/0039891 A1 | 2/2010 | Cambois | |
| 2010/0329079 A1 * | 12/2010 | Hegge | G01V 1/364 367/53 |
| 2011/0317521 A1 * | 12/2011 | Dragoset, Jr. | G01V 1/36 367/53 |
| 2012/0253758 A1 * | 10/2012 | Lazaratos | G01V 1/282 703/2 |
| 2013/0176818 A1 * | 7/2013 | Sablon | G01V 1/36 367/24 |
| 2013/0242696 A1 | 9/2013 | van Groenestijn et al. | |
| 2013/0301387 A1 | 11/2013 | van Groenestijn | |
| 2013/0322205 A1 | 12/2013 | Widmaier et al. | |

OTHER PUBLICATIONS

Wang et al.Postmigration multiple prediction and removal in the depth domain, Oct. 2011, Geophysics, pp. 217-223.*

Guo et al., A new multiple subtraction method using the attributes of predicted multiples, SEG 2008, 2451-2455.*

Luo et al.,Simultaneous inversion of multiples and primaries: Inversion versus subtraction, 2003, 814-818.*

Robinson, Enders A., "Predictive Decomposition of Time Series with Application to Seismic Exploration," Geophysics, vol. XXXII, No. 3, Jun. 1967, pp. 418-484.

Berryhill, J.R., et al., Deep-water peg legs and multiples: Emulation and suppression, vol. 51, No. 12, Dec. 1986, pp. 2177-2184.

Guitton, A., et al., "Adaptive subtraction of multiples using the L1-norm," Geophysical Prospecting, 2004, 52, pp. 27-38.

Hampson, Dan, "Inverse Velocity Stacking for Multiple Elimination," pp. 422-424.

Kelly, Steve, et al., "Inversion of refractions and reflections by full-waveform inversion for marine streamer data: Classification of problem types and solution methods," The Leading Edge, Sep. 2013, pp. 1130-1138.

"Diffracted Multiple Reduction," Tech Link, A Publication of Petroleum Geo-Services, vol. 10 No. 7, Aug. 2010, pp. 1-4.

Lokshtanov, Dmitri, "Multiple suppression by single channel and multichannel deconvolution in the tau-p domain," Norsk Hydro Research Centre, Norway, pp. 1482-1485.

Verschuur, D.J., "Surface-Related Multiple Removal in Seismic Data by a Data-Driven Methodology," Delft University of Technology, Delft, The Netherlands, 3rd International Conference & Exhibition on "Underwater Acoustic Measurements: Technologies & Results," pp. 91-97.

* cited by examiner

US 9,817,143 B2

METHODS AND SYSTEMS FOR CONSTRAINING MULTIPLES ATTENUATION IN SEISMIC DATA

BACKGROUND

In the past few decades, the petroleum industry has invested heavily in the development of marine seismic survey techniques that yield knowledge of subterranean formations beneath a body of water in order to find and extract valuable resources, such as oil. High-resolution seismic images of a subterranean formation are essential for quantitative seismic interpretation and petroleum reservoir monitoring. For a typical marine seismic survey, a survey vessel tows a seismic source, and the same vessel, or another vessel, tows one or more streamers that form a seismic data acquisition surface below the surface of the water and above a subterranean formation to be surveyed for resources. The survey vessel typically contains seismic acquisition equipment, such as navigation control, seismic source control, seismic receiver control, and recording equipment. The seismic source control activates a seismic source, which is typically an array of source elements, such as air guns or marine vibrators, that produces acoustic signals at selected times. Each acoustic signal is a sound wave that travels down through the water and into the subterranean formation. At each interface between different types of rock, a portion of the sound wave may be transmitted and another portion may be reflected back into the body of water as a wavefield that propagates upward toward the water surface. The streamers towed behind the vessel are typically elongated, cable-like structures equipped with a number of seismic receivers or multi-component sensors that detect pressure and/or particle motion wavefields associated with the wavefields reflected back into the water from the subterranean formation.

Sound waves that propagate down into the formation, undergo a single reflection from an interface, and are subsequently detected by seismic receivers are called "primary reflections." However, the water surface may act as a near perfect reflector by reflecting sound waves back down toward the subterranean formation. As a result, each reflection from the water surface may generate a reverberation of multiple reflections. These reflections are called "surface-related multiples" Multiple reflections may also be generated by sound waves reflected within the subsurface without reflections from the water surface. These reflections are called "internal multiples." Seismic data generated by a receiver typically records the primary reflections and the surface-related and internal multiples. As a result, seismic data-processing techniques that depend on the primary reflections are often obscured or contaminated by the surface-related and internal multiples, making analysis of the formation a challenge. Geophysicist, petroleum engineers, and others working in the petroleum industry continue to seek systems and methods that attenuate the contribution of surface-related and internal multiples in seismic data.

DETAILED DESCRIPTION

This disclosure presents systems and methods for attenuating multiples in seismic data. In one aspect, predicted surface-related multiples may be calculated for seismic data generated by receivers in a marine survey. Estimates of primaries and multiples may be calculated by applying adaptive subtraction to the predicted surface-related multiples. Any residual multiples present in the estimated primaries may be calculated using multiple diffraction reduction (MDR). The residual multiples and estimated multiples may be used to generate final estimated multiples that approximate multiples recorded in the seismic data. The final estimated multiples may be subtracted from the seismic data to generate final estimated primaries, which are an approximation of the primaries recorded in the seismic data with contributions from the surface-related multiples and internal multiples attenuated.

Figure 1A:
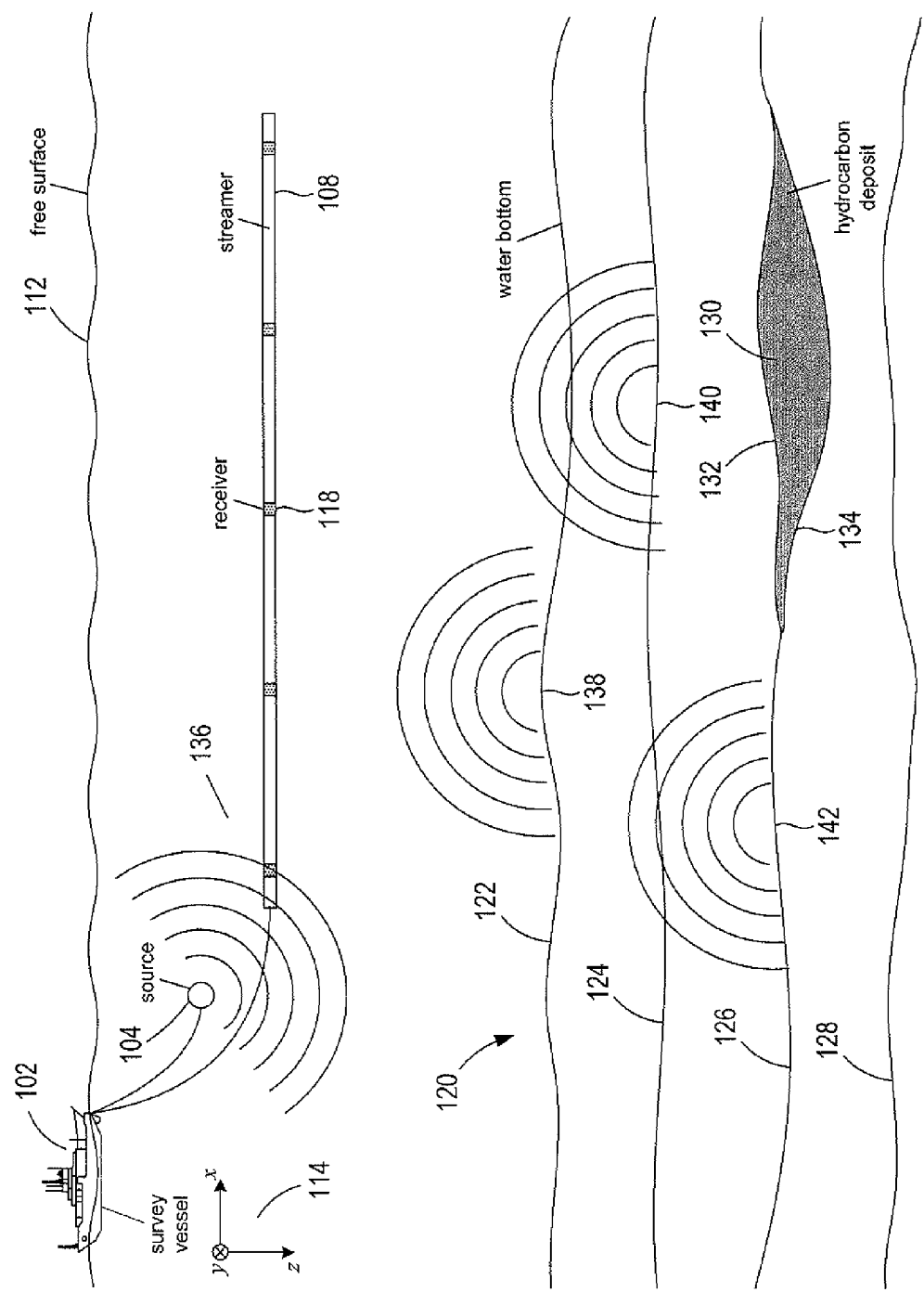
FIGS. 1A-1B show side-elevation and top views of an example seismic data acquisition system.
Figure 1B:
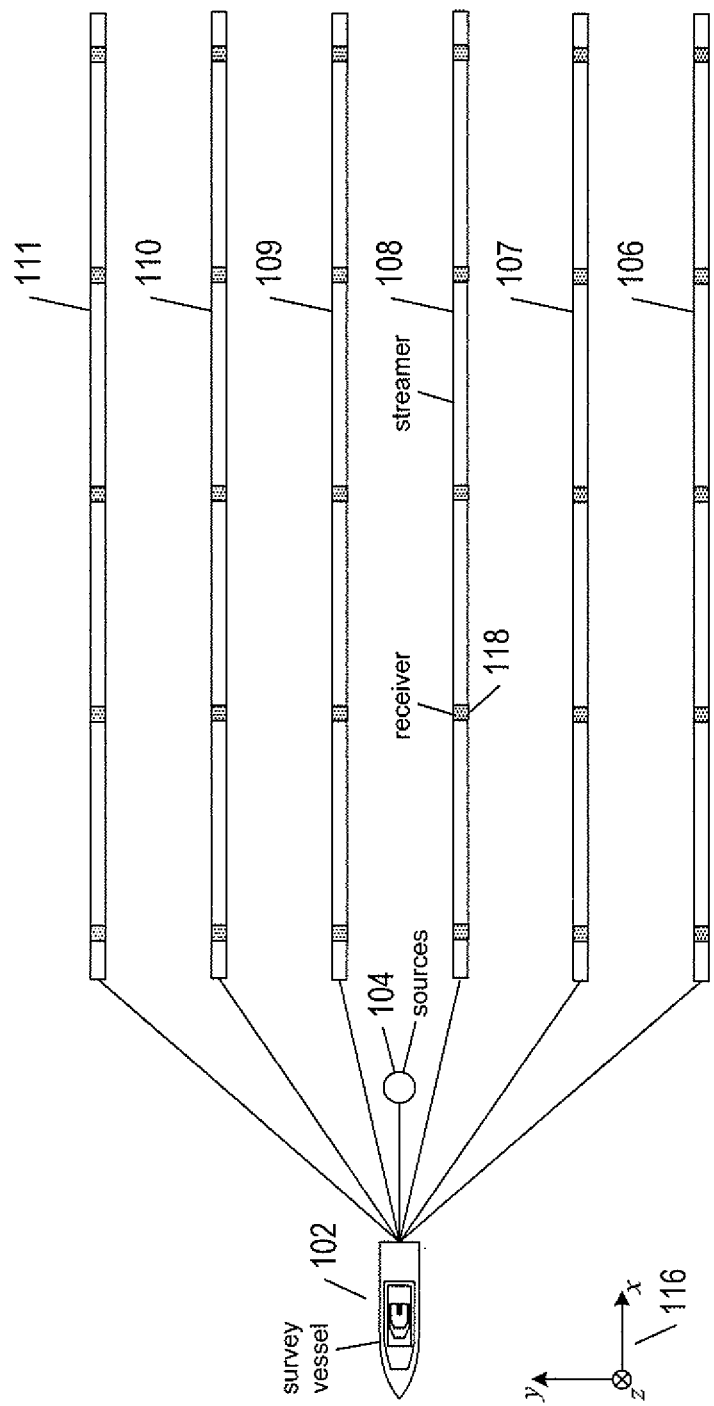

FIGS. 1A-1B show side-elevation and top views, respectively, of an example seismic data acquisition system composed of a survey vessel 102 towing a source 104 and six separate streamers 106-111 beneath a free surface 112 of a body of water. The body of water can be, for example, an ocean, a sea, a lake, or a river, or any portion thereof. In this example, each streamer is attached at one end to the survey vessel 102 via a streamer-data-transmission cable. The illustrated streamers 106-111 form a planar horizontal data acquisition surface with respect to the free surface 112. However, in practice, the data acquisition surface may be smoothly varying due to active sea currents and weather conditions. In other words, although the streamers 106-111 are illustrated in FIGS. 1A and 1B and subsequent figures as straight and substantially parallel to the free surface 112, in practice, the towed streamers may undulate as a result of dynamic conditions of the body of water in which the streamers are submerged. A data acquisition surface is not limited to having a planar horizontal orientation with respect to the free surface 112. The streamers may be towed at depths that angle the data acquisition surface with respect to the free surface 112 or one or more of the streamers may be towed at different depths. A data acquisition surface is not limited to six streamers as shown in FIG. 1B. In practice, the number of streamers used to form a data acquisition surface can range from as few as one streamer to as many as 20 or more streamers. It should also be noted that the number of sources is not limited to a single source. In practice, the number of sources selected to generate acoustic energy may range from as few as one source to three or more sources and the sources may be towed in groups by one or more vessels.

FIG. 1A includes an xz-plane 114 and FIG. 1B includes an xy-plane 116 of the same Cartesian coordinate system having three orthogonal, spatial coordinate axes labeled x, y and z. The coordinate system is used to specify orientations and coordinate locations within the body of water. The x-direction specifies the position of a point in a direction parallel to the length of the streamers (or a specified portion thereof when the length of the streamers are curved) and is referred to as the "in-line" direction. The y-direction specifies the position of a point in a direction perpendicular to the x-axis and substantially parallel to the free surface 112 and is referred to as the "cross-line" direction. The z-direction specifies the position of a point perpendicular to the xy-plane (i.e., perpendicular to the free surface 112) with the positive z-direction pointing downward away from the free surface 112. The streamers 106-111 are long cables containing power and data-transmission lines that connect receivers represented by shaded rectangles 118 spaced-apart along the length of each streamer to seismic acquisition equipment and data-storages devices located on board the survey vessel 102.

Streamer depth below the free surface 112 can be estimated at various locations along the streamers using depth measuring devices attached to the streamers. For example, the depth measuring devices can measure hydrostatic pressure or utilize acoustic distance measurements. The depth measuring devices can be integrated with depth controllers, such as paravanes or water kites that control and maintain the depth and position of the streamers as the streamers are towed through the body of water. The depth measuring devices are typically placed at intervals (e.g., about 300 meter intervals in some implementations) along each streamer. Note that in other implementations buoys may be attached to the streamers and used to maintain the orientation and depth of the streamers below the free surface 112.

FIG. 1A shows a cross-sectional view of the survey vessel 102 towing the source 104 above a subterranean formation 120. Curve 122 represents a top surface of the subterranean formation 120 located at the bottom of the body of water. The subterranean formation 120 is composed of a number of subterranean layers of sediment and rock. Curves 124, 126, and 128 represent interfaces between subterranean layers of different compositions. A shaded region 130, bounded at the top by a curve 132 and at the bottom by a curve 134, represents a subterranean hydrocarbon deposit, the depth and positional coordinates of which may be determined, at least in part, by analysis of seismic data collected during a marine seismic survey. As the survey vessel 102 moves over the subterranean formation 120, the source 104 is activated to produce an acoustic signal called a "shot" at spatial and/or temporal intervals. In other implementations, the source 104 may be towed by one survey vessel and the streamers may be towed by a different survey vessel. The source 104 may be an air gun, marine vibrator, or composed of an array of air guns and/or marine vibrators. FIG. 1A illustrates an acoustic signal expanding outward from the source 104 as a pressure wavefield 136 represented by semicircles of increasing radius centered at the source 104. The outwardly expanding wavefronts from the sources may be spherical but are shown in vertical plane cross section in FIG. 1A. The outward and downward expanding portion of the pressure wavefield 136 is called the "primary wavefield," which eventually reaches the formation surface 122, at which point the primary wavefield is partially reflected from the formation surface 122 and partially refracted downward into the subterranean formation 120, becoming elastic waves within the subterranean formation 120. In other words, in the body of water, the acoustic signal is composed of compressional pressure waves, or P-waves, while in the subterranean formation 120, the waves include both P-waves and transverse waves, or S-waves. Within the subterranean formation 120, at each interface between different types of materials or at discontinuities in density or in one or more of various other physical characteristics or parameters, downward propagating waves are partially reflected and partially refracted. As a result, each point of the formation surface 122 and each point of the interfaces 124, 126, and 128 is a reflector that becomes a potential secondary point source from which acoustic and elastic wave energy, respectively, may emanate upward toward the receivers 118 in response to the acoustic signal generated by the source 104 and downward-propagating elastic waves generated from the pressure impulse. As shown in FIG. 1A, secondary waves of significant amplitude may be generally emitted from points on or close to the formation surface 122, such as point 138, and from points on or very close to interfaces in the subterranean formation 120, such as points 140 and 142.

The secondary waves may be generally emitted at different times within a range of times following the initial acoustic signal. A point on the formation surface 122, such as the point 138, may receive a pressure disturbance from the primary wavefield more quickly than a point within the subterranean formation 120, such as points 140 and 142. Similarly, a point on the formation surface 122 directly beneath the source 104 may receive the pressure disturbance sooner than a more distant-lying point on the formation surface 122. Thus, the times at which secondary and higher-order waves are emitted from various points within the subterranean formation 120 may be related to the distance, in three-dimensional space, of the points from the activated source.

Acoustic and elastic waves, however, may travel at different velocities within different materials as well as within the same material under different pressures. Therefore, the travel times of the primary wavefield and secondary wavefield emitted in response to the primary wavefield may be functions of distance from the source 104 as well as the materials and physical characteristics of the materials through which the wavefields travel. In addition, the secondary expanding wavefronts may be altered as the wavefronts cross interfaces and as the velocity of sound varies in the media are traversed by the wave. The superposition of waves emitted from within the subterranean formation 120 in response to the primary wavefield may be a generally complicated wavefield that includes information about the shapes, sizes, and material characteristics of the subterranean formation 120, including information about the shapes, sizes, and locations of the various reflecting features within the subterranean formation 120 of interest to exploration seismologists.

Figure 2:
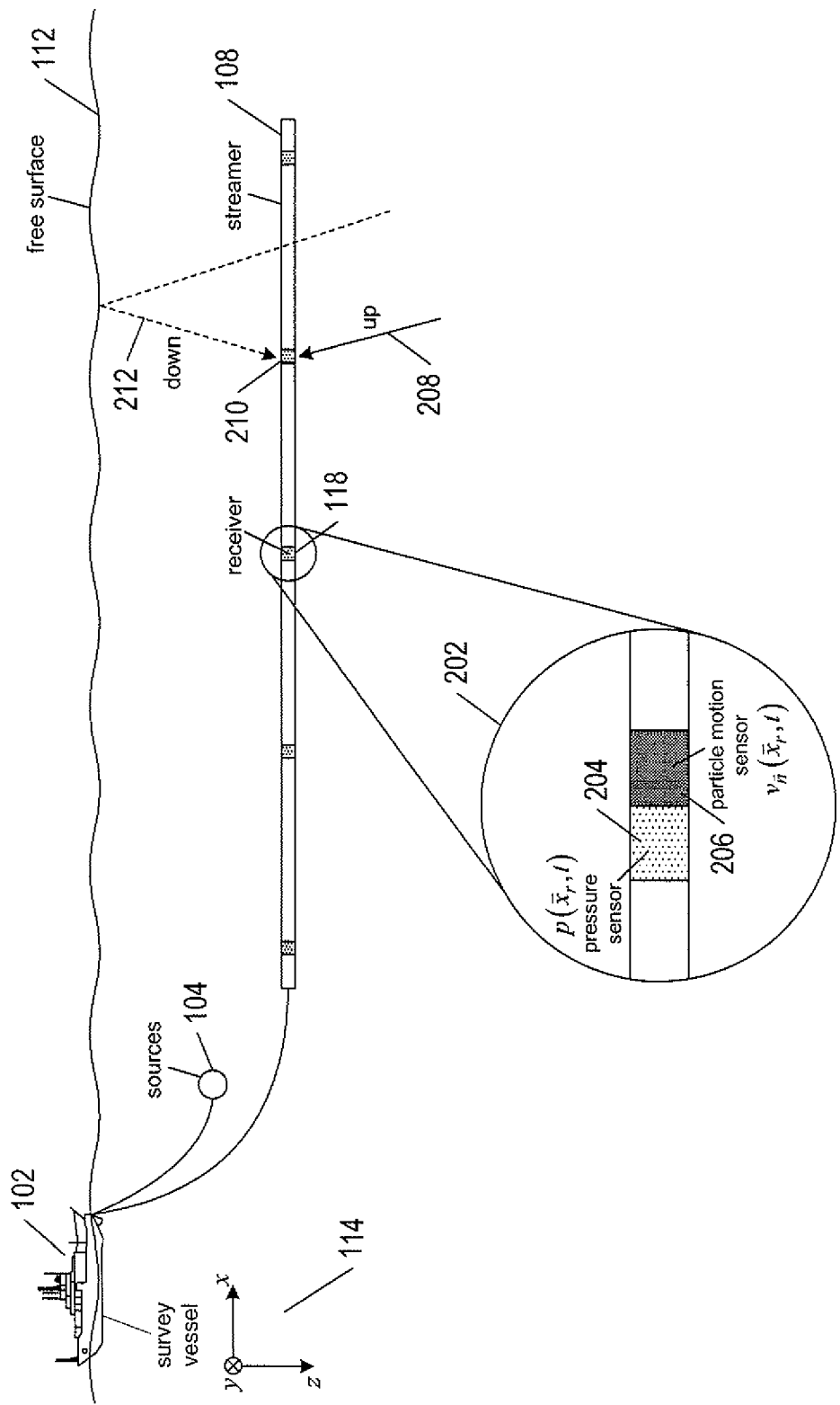
FIG. 2 shows a side-elevation view of marine seismic data acquisition system with a magnified view of a receiver.

Each receiver 118 may include a particle motion sensor that detects particle motion, velocities, or accelerations over time, a pressure sensor that detects variations in water pressure over time, or a combination of particle motion and pressure sensors. FIG. 2 shows a side-elevation view of the marine seismic data acquisition system with a magnified view 202 of the receiver 118. In this example, the magnified view 202 reveals that the receiver 118 is a dual sensor composed of a pressure sensor 204 and a particle motion sensor 206. The pressure sensor may be, for example, a hydrophone. Each pressure sensor may measure changes in hydrostatic pressure over time and may produce pressure data denoted by $p(\vec{x}, t)$, where $\vec{x}$ represents the Cartesian coordinates (x, y, z) of the receiver, and t represents time. The motion sensors may be responsive to water motion. In general, particle motion sensors detect particle motion in a direction normal to the orientation of the particle motion sensor and may be responsive to such directional displacement of the particles, velocity of the particles, or acceleration of the particles. The motion sensor data produced by the particle motion sensors may be converted to particle motion velocity data. For example, when motion sensors that are responsive to position are used, the motion sensor data denoted by $g_{\vec{n}}(\vec{x}, t)$ may be differentiated to convert the data to particle motion velocity data denoted by $v_{\vec{n}}(\vec{x}, t)$, where unit normal vector $\vec{n}$ points in the direction particle motion is measured. Likewise, when motion sensors that are responsive to acceleration (i.e., accelerometers) are used, the particle acceleration data denoted by $a_{\vec{n}}(\vec{x}, t)$ may be integrated to convert the data to particle motion velocity data $v_{\vec{n}}(\vec{x}, t)$. The particle motion sensors are typically oriented so that the particle motion is measured in the vertical direction (i.e., $\vec{n}=(0,0,z)$) in which case $v_z(\vec{x}, t)$ is called the vertical velocity data. Alternatively, each receiver may include two additional particle motion sensors that measure particle motion in two other directions, $\vec{n}_1$ and $\vec{n}_2$, that are orthogonal to $\vec{n}$ (i.e., $\vec{n} \cdot \vec{n}_1 = \vec{n} \cdot \vec{n}_2 = 0$, where "·" is the scalar product) and orthogonal to one another (i.e., $\vec{n}_1 \cdot \vec{n}_2 = 0$). In other words, each receiver may include three particle motion sensors that measure particle motion in three orthogonal directions. For example, in addition to having a particle motion sensor that measures particle motion in the z-direction to give $v_z(\vec{x}, t)$, each receiver may include a particle motion sensor that measures the wavefield in the in-line direction in order to obtain the inline velocity wavefield, $v_x(\vec{x}, t)$, and a particle motion sensor that measures the wavefield in the cross-line direction in order to obtain the cross-line velocity wavefield, $v_y(\vec{x}, t)$. In certain implementations, the receivers may by composed of only pressure sensors, and in other implementations, the receivers may be composed of only particle motion sensors.

Seismic data includes the pressure and particle motion data. The streamers 106-111 and the survey vessel 102 may include sensing electronics and data-processing facilities that allow seismic data generated by each receiver to be correlated with absolute positions on the free surface 112 and absolute three-dimensional positions with respect to an arbitrary three-dimensional coordinate system. The pressure data and particle motion data may stored at the receiver, and/or may be sent along the streamers and data transmission cables to the survey vessel 102, where the data may be stored electronically or magnetically on data-storage devices located onboard the survey vessel 102. The pressure data and particle motion data represent pressure and velocity wavefields and, therefore, may also be referred to as the pressure wavefield and velocity wavefield, respectively.

In FIG. 2, directional arrow 208 represents the direction of an up-going wavefield at the location of receiver 210 and dashed arrow 212 represents a down-going wavefield produced by an up-going wavefield reflection from the free surface 112 before reaching the receiver 210. In other words, the pressure wavefield $p(\vec{x}, t)$ is composed of an up-going pressure wavefield component and a down-going pressure wavefield component, and the particle motion wavefield $g_{\vec{n}}(\vec{x}, t)$ is composed of an up-going particle motion wavefield component and a down-going particle motion wavefield component. The down-going wavefield contaminates pressure and particle motion data and creates notches in the seismic data spectral domain. Filtering may be done to remove the down-going wavefields from the pressure and particle motion data, leaving the up-going wavefields which are typically used to analyze the subterranean formation.

As explained above, each pressure sensor and particle motion sensor generates seismic data that may be stored in data-storage devices located onboard the survey vessel. The seismic data measured by each pressure sensor or motion sensor is a time series that consist of a number of consecutively measured values called amplitudes separated in time by a sample rate. The time series measured by a pressure or motion sensor is called a "trace," which may consist of thousands of samples collected at a sample rate of about 1 to 5 ms. A trace is a recording of a subterranean formation response to acoustic energy that passes from an activated source, into the subterranean formation where a portion of the acoustic energy is reflected and ultimately detected by a sensor as described above. A trace records variations in a time-dependent amplitude that represents acoustic energy in the portion of the secondary wavefield measured by the sensor. In other words, each trace is a set of time-dependent pressure or motion sensor amplitudes denoted by trace(j)=$\{A(j, t_k)\}_{k=1}^{K}$, where j is the trace or receiver index, $A(j, t_k)$ is the amplitude of trace j at time sample $t_k$, and K is the number of time samples in the trace.

As explained above, the secondary wavefield typically arrives first at the receivers located closest to the sources. The distance from the sources to a receiver is called the "source-receiver offset," or simply "offset," which creates a delay in the arrival time of a secondary wavefield from a substantially horizontal interface within the subterranean formation. A larger offset generally results in a longer arrival time delay. The traces are collected to form a "gather" that can be further processed using various seismic computational processing techniques in order to obtain information about the structure of the subterranean formation.

Figure 3A:
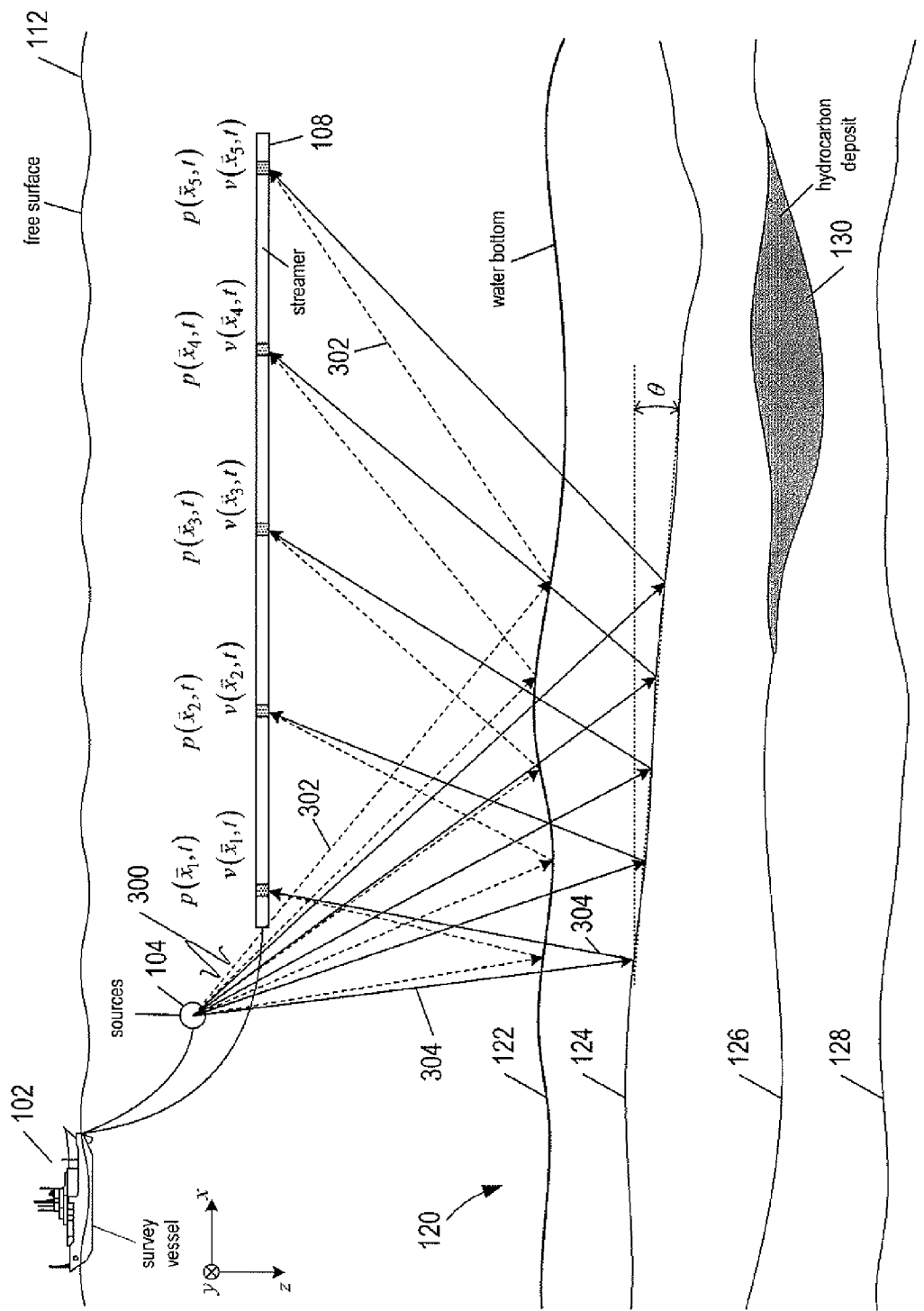
FIG. 3A shows an example of acoustic energy ray paths emanating from a source.

FIG. 3A shows example ray paths that represent paths of an acoustic signal 300 that travels from the first source 104 into the subterranean formation 120. Dashed-line rays, such as rays 302, represent acoustic energy reflected from the formation surface 122 to the receivers located along the streamer 108, and solid-line rays, such as rays 304, represent acoustic energy reflected from the interface 124 to the receivers located along the streamer 108. Note that for simplicity of illustration only a hand full of ray paths are represented. Each pressure sensor may measure the hydrostatic pressure, and each motion sensor may measure particle motion of the acoustic energy reflected from the formation 120. The hydrostatic pressure data and/or particle motion data generated at each receiver may be time sampled and recorded as separate traces. In the example of FIG. 3A, the collection of traces generated by the receivers along the streamer 108 for a single shot from the source 104 form a "common-shot gather" or simply a "shot gather" or "gather." The traces generated by the receivers located along each of the other five streamers for the same shot may be collected to form separate shot gathers; each gather associated with one of the streamers.

Figure 3B:
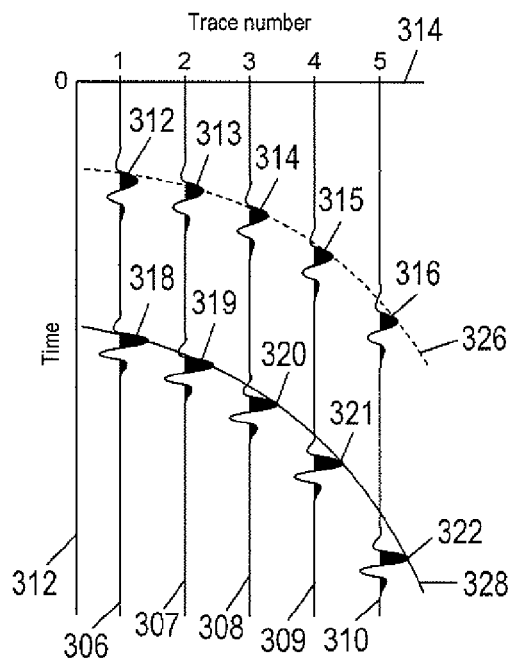
FIGS. 3B-3D shows plots of gathers.

FIG. 3B shows a plot of a shot gather composed of example traces 306-310 of the wavefield recorded by the five receives located along the streamer 108 shown in FIG. 3A. Vertical axis 312 represents time and horizontal axis 314 represents trace numbers with trace "1" representing the seismic data generated by the receiver located closest to the source 104 and trace "5" representing the seismic data generated by the receiver located farthest from the source 104. The traces 306-310 may represent variation in the amplitude of either the pressure data or the particle motion data recorded by corresponding sensors of the five receivers. The example traces include wavelets or pulses 312-316 and 318-322 that represent the up-going wavefield measured by the pressure sensors or motion sensors. Peaks, colored black, and troughs of each trace represent changes in the amplitude measured by the pressure sensors or motion sensors. The distances along the traces 306-310 from the trace number axis 314 (i.e., time zero) to the wavelets 312-316 represents the travel time of the acoustic energy output from the source 104 to the formation surface 122 and to the receivers located along the streamer 108, and wavelets 318-322 represents the longer travel time of the acoustic energy output from the source 104 to the interface 124 and to the same receivers located along the streamer 108. The amplitude of the peak or trough of the wavelets 312-316 and 318-322 indicate the magnitude of the reflected acoustic energy recorded by the sensors.

The arrival times versus source-receiver offset is typically longer with increasing source-receiver offset. As a result, the wavelets generated by a surface or an interface are collectively called a "reflected wave" that tracks a hyperbolic curve. For example, dashed hyperbolic curve 326 represents the hyperbolic distribution of the wavelets 312-316 reflected from the formation surface 122, which are called a "surface reflected wave," and solid hyperbolic curve 328 represents the hyperbolic distribution of the wavelets 318-322 from the interface 124, which are called an "interface reflected wave."

Figure 3C:
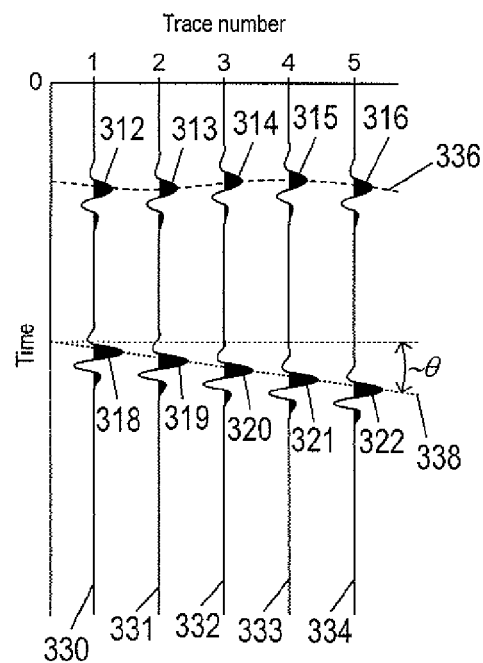

The traces from different source-receiver pairs may be corrected during seismic data processing to remove the effects of different source-receiver offsets in a process called "normal moveout" ("NMO"). FIG. 3C shows a gather of traces 330-334 after NMO has been applied to align the wavelets in time as represented by dashed-line curve 336 for the wavelets 312-316 and line 338 for the wavelets 318-323. Curve 336 approximates the curvature of the formation surface 122 below the streamer 108 shown in FIG. 3A, and line 338 approximates the curvature and dip angle θ of the interface 124 below the streamer 108 shown in FIG. 3A. The dip angle is the magnitude of inclination of a plane from horizontal. After NMO corrections, traces from different shot records with a common reflection point may be stacked to form a single trace during seismic data processing. Stacking may improve the signal-to-noise ratio, reduce noise, improve seismic data quality, and reduce the amount of data.

Figure 3D:
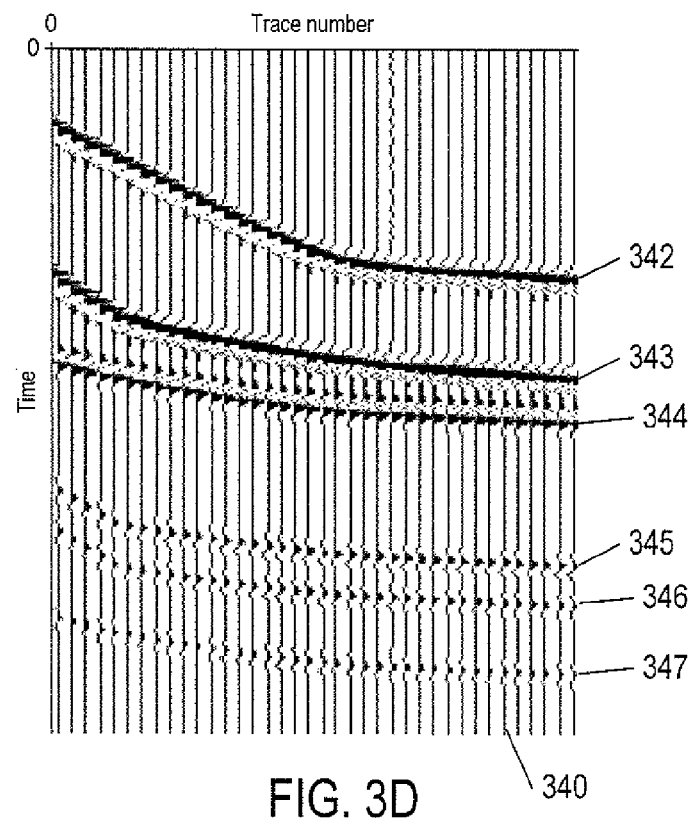

FIG. 3D shows an expanded view of a gather composed of 38 traces. Each trace, such as trace 340, varies in amplitude over time and represents acoustic energy reflected from the surface and five different interfaces within a subterranean formation as measured by a pressure sensor or a motion sensor. In the expanded view, wavelets that correspond to reflection from the same surface or interface of the subterranean formation appear chained together to form reflected waves. For example, wavelets 342 with the shortest transit time represent a surface reflected wave, and wavelets 343 represent an interface reflected wave emanating from an interface just below the surface. Reflected waves 344-347 represent reflections from interfaces located deeper within the subterranean formation.

The gathers shown in FIG. 3B-3D are described for seismic data sorted into a common-shot domain. A domain is a collection of gathers that share a common geometrical attribute with respect to the seismic data recording locations. However, implementations of the method for attenuating noise in seismic data are not limited to seismic data sorted in the common-shot domain. The seismic data may be sorted into any suitable domain for examining the features of a subterranean formation including a common-offset domain, common-receiver domain, or common-midpoint domain.

Figure 4:
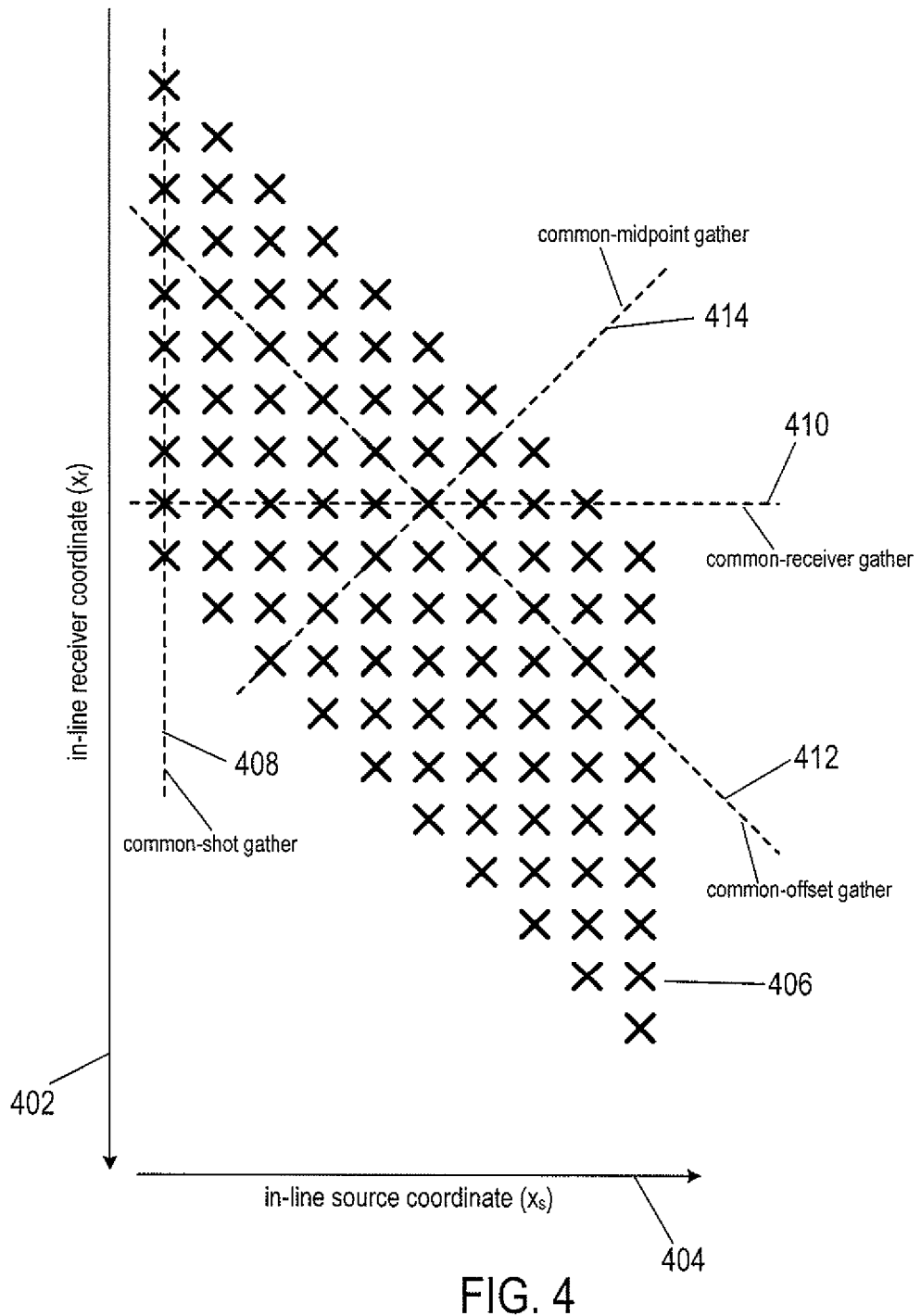
FIG. 4 shows a plot of different ways seismic data collected in a survey may be sorted into domains.

FIG. 4 shows a plot of different ways seismic data collected in a survey may be sorted into different types of domains. Vertical axis 402 represents the in-line receiver coordinates and horizontal axis 404 represents the in-line source coordinates. X's, such as X 406, represent where a recording (i.e., pressure or particle motion) has taken place. In this plot, a column of recordings identified by dashed line 408 represents a shot gather, and a row of recordings identified by dashed line 410 represents a common-receiver gather. Recordings collected along a diagonal represented by dashed line 412 is a common-offset gather and recordings collected along a diagonal represented by dashed line 414 is a common-midpoint gather.

In practice, a typical trace does not record just primary reflections from a surface of, or interface within, a subterranean formation, as represented in FIGS. 3B-3D. In practice, a trace records the time-dependant amplitude of acoustic energy associated with numerous reflections of acoustic energy from within the subterranean formation and the water free surface. Secondary wavefronts that travel directly from the formation surface 122 or from a subterranean interface to the receivers without experiencing reflections from the free surface or other interfaces are called "primary reflections" or simply "primaries." On the other hand, because the free surface 112 acts as a near perfect reflector of acoustic energy, secondary wavefronts that bounce back and forth between the free surface 112 and the subterranean formation before being detected by the receivers are called "surface-related multiples." Another type of multiple reflection is generated by sound waves reflected within the subterranean formation but have no reflections from the free surface. The multiple reflections that take place within the subterranean formation are called "internal multiples."

Figure 5:
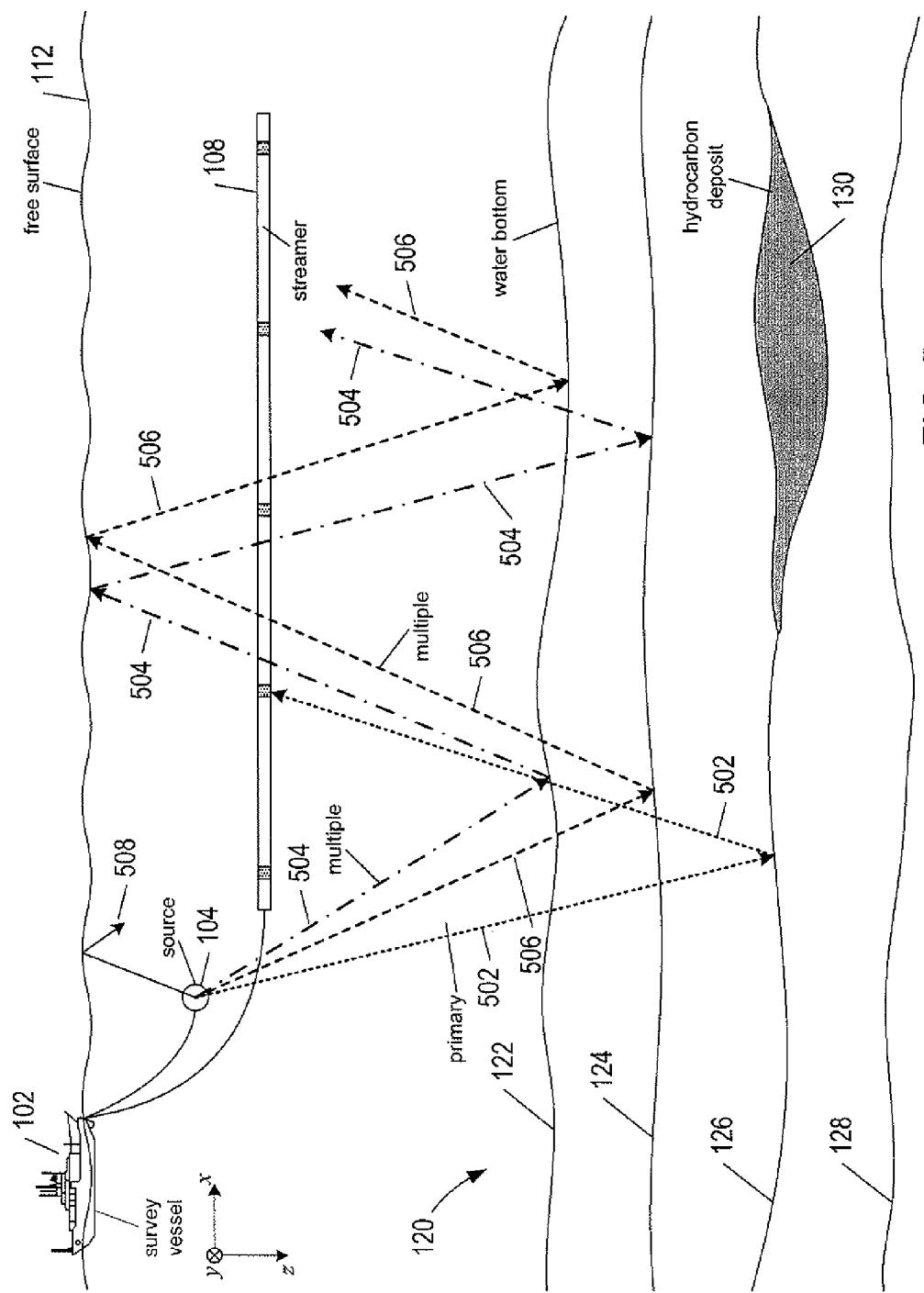
FIG. 5 shows examples of primary and multiple reflections.

FIG. 5 shows examples of primary and multiple reflections. Dotted directional arrows 502 represent a primary reflection in which an acoustic signal generated by the source 104 enters the subterranean formation 120 and undergoes a reflection from the interface 126 back through the subterranean formation 120 and into the body of water to be measured by a receiver. On the other hand, dot-dash line directional arrows 504 represent a multiple reflection in which the acoustic signal undergoes multiple reflections consisting of a reflection from the formation surface 122 followed by a reflection from the free surface 112 and a subsequent reflection from the interface 124 before being measured by a receiver. Dashed-line directional arrows 506 represent multiple reflections consisting of a reflection from the interface 124 followed by a reflection from the free surface 112 and a reflection from the formation surface 122 before being measured by a receiver. There are any number of other different kinds of multiple reflections including sound waves produced by the source 104 that are first reflected from the free surface 112, as represented by directional arrow 508, before the waves travel into the subterranean formation to produce scattered wavefields directed back toward the free surface 112. Multiple reflections may also include more than one reflection between interfaces within the subterranean formation before being measured by receivers of the acquisition surface.

A difference between a primary and a multiple recorded at the same receiver and at approximately the same time is that, on average, the multiple typically has a higher frequency content than the primary. This is because a typical primary spends most of its time traveling deeper into the subterranean formation while, on average, a multiple spends most of its time traveling in shallower regions of the subterranean formation and in the water column above the subterranean formation. Sound waves that travel in shallow regions of the subterranean formation and the water column have less frequency attenuation than sound waves that travel deeper into the subterranean formation. As a result, multiples typically have a higher frequency content than primaries that arrive at the same receiver and at approximately the same time.

Figure 6C:
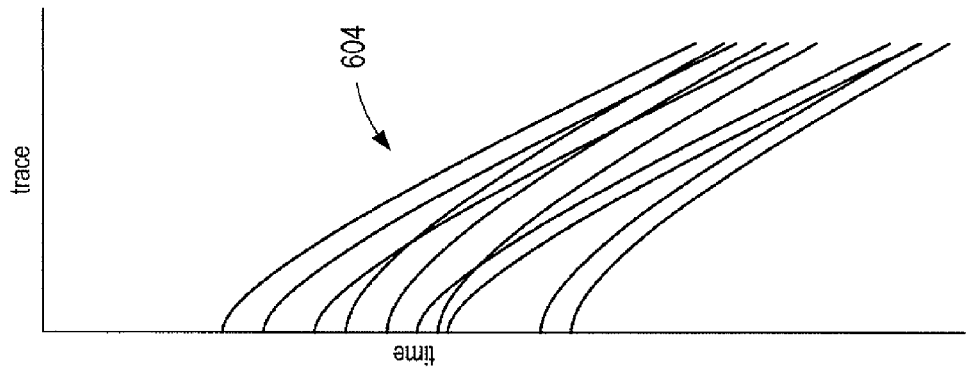
FIG. 6C shows a third synthetic gather of the multiples of FIG. 7B.
Figure 6B:
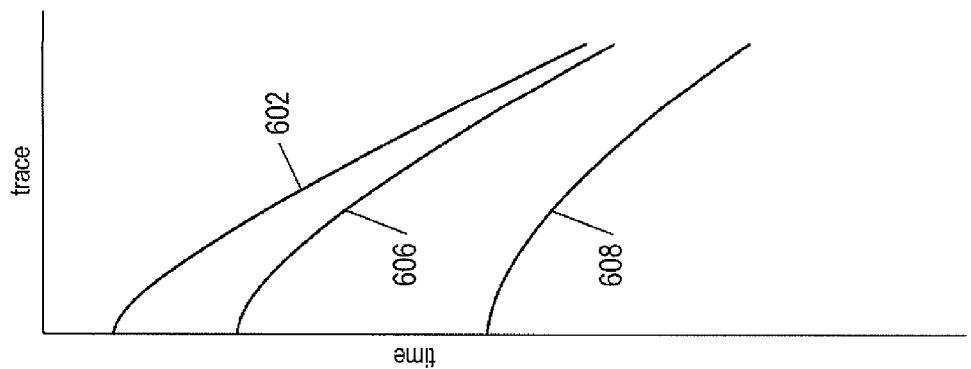
FIG. 6B shows a second synthetic gather of the primaries of FIG. 7A.
Figure 6A:
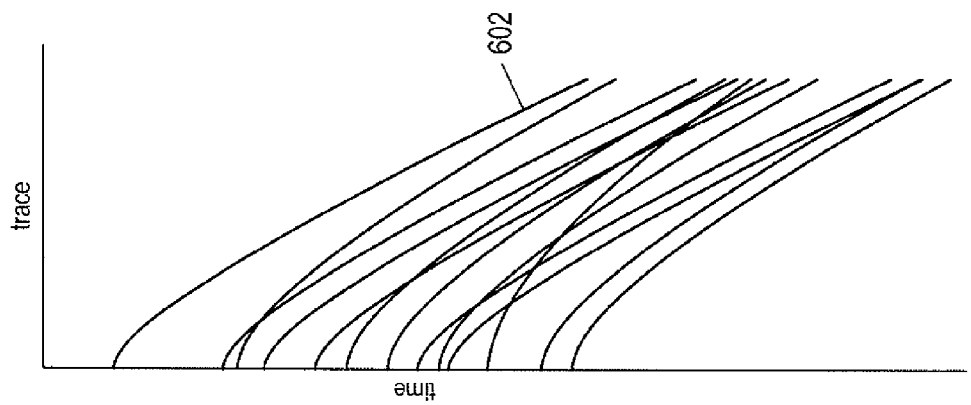
FIG. 6A shows a synthetic gather of traces that include primaries and multiples.

Multiples typically obscure primaries from deeper targets within the subterranean formation. FIG. 6A shows a synthetic gather of traces that include primaries and multiples. Curves, such as curve 602, represent reflected waves. In this hypothetical example, reflected wave 602 corresponds to formation surface reflected wave, but reflected waves that correspond to primaries reflected from structures located deeper within the formation are obscured by reflected waves that correspond to multiples. For the sake of illustrating how multiples are able to obstruct primaries in FIG. 6A, FIG. 6B shows a second synthetic gather of the primaries of FIG. 6A and FIG. 6C shows a third synthetic gather of the multiples of FIG. 6B. The multiples represented by reflected waves 604 in FIG. 6C obstruct the primaries associated with reflected waves 606 and 608 in FIG. 6B when the primaries and the multiples appear in the same gather in FIG. 6A. Unlike the simplistic synthetic illustration provided in FIGS. 6A-6C, in practice, gathers obtained from actual marine surveys are composed of reflected waves from potentially hundreds and thousands of interfaces with varying orientations. As a result, the reflected waves associated with the primaries may appear unintelligible in the gathers, and multiples that are not removed by a computational method will often blur subterranean features shown in seismic images obtained from further processing the gathers.

Computational methods and systems for attenuating multiples in seismic data are now described. Consider a gather composed of seismic data represented by $$\{h(t, x_r, x_s)\} \quad (1)$$

where
  h may represent pressure data p, particle motion data $g_{\vec{n}}$, velocity data $v_{\vec{n}}$, or acceleration data $a_{\vec{n}}$;
  t represents time;
  $x_r$ represents the coordinate location of a receiver; and
  $x_s$ represents the coordinate location of a source.
Each $h(t, x_r, x_s)$ represents seismic data measured at receiver location $x_r$ and source location $x_s$ in the time domain. The gather represented by the set in Equation (1) may be any collection of traces collected after activation of a source. For example, the gather may be a common-shot gather, a common-offset gather, a common-receiver gather, or a common-midpoint gather.

After the traces have been collected to form the gather given by Equation (1), the traces may be transformed from the space-time domain, x-t, to the space-frequency domain, x-f:

$$\{H(w, x_r, x_s)\} \quad (2)$$

where
  H represents the seismic data in the x-f domain; and
  $w=2\pi f$ is the angular frequency of frequency f.
The transformation from the x-t domain to the x-f domain may be accomplished with a fast-Fourier transform, a Laplace transform, or other similar transform. Each $H(w, x_r, x_s)$ represents the seismic data measured at receiver location $x_r$ and source location $x_s$ in the frequency domain.

As explained above with reference to FIG. 2, the seismic data recorded at each receiver includes information about the up-going wavefield scattered upwards from the subterranean formation and the time-delayed version that is reflected downward from the free surface (i.e., the down-going wavefield). As a result, the seismic data recorded by the sensors located at each receiver may be contaminated with unwanted "ghost" reflections and may be characterized as a combination of the up-going and down-going wavefields:

$$H(w, x_r, x_s)=H^{up}(w, x_r, x_s)+H^{down}(w, x_r, x_s)$$

where
  $H^{up}(w, x_r, x_s)$ is the up-going wavefield; and
  $H^{down}(w, x_r, x_s)$ is the down-going wavefield or ghost reflection.
Methods include using dual-sensor information to separate the seismic data into up-going and down-going wavefields, approximate the down-going wavefield, and subtracting the down-going wavefield from the seismic data to obtain x-f domain deghosted seismic data $$\{H^{deg}(w, x_r, x_s)\} \quad (3)$$

where
  $H^{deg}(w, x_r, x_s) \approx H^{up}(w, x_r, x_s)$
After the gather has been deghosted, (free) surface-related multiples may be predicted for each trace in the gather. Prediction of surface-related multiples is based on an assumption that each surface-related multiple consists of a primary or a multiple reflection and a primary connected by a point of reflection at the free surface. For example, each multiple-reflection path from a source to a receiver is assumed to include a primary or a multiple reflection that has travelled upward to a point on the free surface and a primary reflection from the point on the free surface to the receiver. However, the point of reflection along the free surface is not known in advance. As a result, a predicted surface-related multiple may be estimated by combining a number of possible reflection points along the free surface. Prediction of surface-related multiples may be mathematically formulated as an iterative process with a predicted surface-related multiple calculated according to $$m_{pred}^{(n)}(\omega, x_r, x_s) = \sum_{k=1}^{K} H_0^{(n-1)}(\omega, x_r, x_k) \cdot H^{deg}(\omega, x_k, x_s) \quad (4)$$

where
  n is a positive integer iteration index;
  K is a selected number of points of reflection from the free surface;
  $H^{deg}(w, x_k, x_s)$ represents the deghosted seismic data measured at receiver location $x_k$ and source location $x_s$; and
  $H_0^{(n-1)}(w, x_r, x_k)$ is an estimate of a primary reflection at receiver location $x_r$ and source location $x_k$.

For example, $H^{deg}(w, x_k, x_s)$ may represent seismic data generated by receivers in a common-shot gather, such as common-shot gather 408 in FIG. 4, and $H_0^{(n-1)}(w, x_r, x_k)$ may represent seismic data generated by a receiver for different locations of a source in a common-receiver gather, such as common-receiver gather 410 in FIG. 4.

In a first iteration, an estimate of the primary wavefield) $H_0^{(0)}(w, x_r, x_k)$ is assigned the seismic data $H^{deg}(w, x_k, x_s)$. For iterations 1 to N, an estimate of the primary reflection is calculated according to $$H_0^{(n)}(w, x_r, x_k) = H^{deg}(w, x_k, x_s) - A(w) \cdot m_{pred}^{(n)}(w, x_r, x_s) \quad (5)$$

where
  N is a selected number of iterations; and
  A(w) is the matching filter.
In the frequency domain, the matching filter may be calculated as $$A(w) = S(w)^{-1} \cdot R$$

where
  R is the free surface reflectivity (for example, R~−1); and
  $S(w)^{-1}$ is the inverse of the down-going source wavefield.
Calculation of a set of predicted surface-related multiples may be executed according to the following pseudo code for each $H^{deg}(w, x_r, x_s)$ in the set $\{H^{deg}(w, x_r, x_s)\}$:

```
1   for each H^deg(ω, x_r, x_s) in {H^deg(ω, x_r, x_s)} {
2     for k = 1, ..., K {
3       H_0^(0)(ω, x_r, x_k) = H^deg(ω, x_k, x_s);
4     }
5     for n = 1, ..., N {
6       m_pred^(n)(ω, x_r, x_s) = Σ_{k=1}^K H_0^(n-1)(ω, x_r, x_k) · H^deg(ω, x_k, x_s);
7       A(ω) = S(ω)^{-1} · R;
8       for k = 1, ..., K {
9         H_0^(n)(ω, x_r, x_k) = H^deg(ω, x_k, x_s) − A(ω) · m_pred^(n)(ω, x_r, x_s);
10      }
11    }
12    store m_pred^(N)(ω, x_r, x_s);
13  }
```

The predicted surface-related multiples $m_{pred}^{(N)}(w, x_r, x_s) = m_{pred}(w, x_r, x_s)$, where the superscript (N) is deleted for the sake of convenience, are calculated for each $H^{deg}(w, x_r, x_s)$ in the gather $\{H^{deg}(w, x_r, x_s)\}$ and collected to form a set of predicted surface-related multiples $\{m_{pred}(w, x_r, x_s)\}$. However, predicted surface-related multiples may contain incorrect amplitudes and timing errors due to incomplete seismic data, and the predicted surface-related multiples may include a wavelet convolved with itself. In order to correct amplitudes and timing errors in the predicted surface-related multiples, adaptive subtraction may be used to calculate estimated multiples $\{m_A(w, x_r, x_s)\}$ and a corresponding gather of estimated primaries $\{H_A(w, x_r, x_s)\}$. Adaptive subtraction may be carried out in the space-time domain and may be implemented, in this case, by minimizing an objective function formulated as an L2-norm with an iteratively reweighted least-squares method. Using either a fast inverse Fourier transform or an inverse Laplace transformation, the gather $\{H^{deg}(w, x_r, x_s)\}$ may be transformed back to the space-time domain to give deghosted space-time gather $\{h^{deg}(t, x_r, x_s)\}$ and the predicted surface-related multiples $\{m_{pred}(w, x_r, x_s)\}$ may be transformed to give space-time domain predicted surface-related multiples $\{m_{pred}(t, x_r, x_s)\}$. The adaptive subtraction uses a first objective function formulated as an L2-norm given by:

$$e_1(f) = \sum_{x_s} \sum_{x_r} \|h^{deg}(t, x_r, x_s) - m_{pred}(t, x_r, x_s) * f_1(t)\|_2^2 \quad (6)$$

where
  $f_1(t)$ is a time-dependent filter with coefficients denoted by $[c_1(t), c_2(t), \ldots, c_n(t)]$ with filter length n; and
  "*" represents convolution.
An aggressive choice for coefficients in the filter $f_1(t)$ removes all multiple energy but may also remove some primary energy. This is especially the case where multiples overlap with strong primaries in the gathers. On the other hand, a conservative choice of coefficients may in some cases not remove enough multiples energy. An example of an aggressive choice for coefficients is a long filter length n, and a conservative coice for coefficients is a short filter length n. The more filter coefficients there are in the filter $f_1(t)$, the more possibilities there are to remove multiples and, as an undesirable consequence, primaries. As a result, the filter length n is selected to remove multiples energy and avoid removal of primaries energy.

The filter $f_1(t)$ is convolved with the predicted surface-related multiples to give a set of estimated multiples:

$$\{m_A(t, x_r, x_s)\} \quad (7)$$

where
  $m_A(t, x_r, x_s) = m_{pred}(t, x_r, x_s) * (t)$.
Note that the length of $f_1(t)$ may differ from the lengths of $h^{deg}(t, x_r, x_s)$ and $m_{pred}(t, x_r, x_s)$. Using a fast-Fourier transform or a Laplace transform, the set of estimated multiples $\{m_A(t, x_r, x_s)\}$ in Equation (7) may be transformed from the x-t domain to the x-f domain to give estimated multiples $\{m_A(w, x_r, x_s)\}$.

In other implementations, the estimated multiples $\{m_A(w, x_r, x_s)\}$ may be generated by first transforming the predicted surface-related multiples $\{m_{pred}(t, x_r, x_s)\}$ and the filter $f_1(t)$ from the x-t domain to the x-f domain using either a fast-Fourier transform or a Laplace transform followed by multiplication in the x-f domain (i.e., $m_A(w, x_r, x_s) = m_{pred}(w, x_r, x_s) \cdot f_1(w)$).

An aggressive choice for parameters in Equation (6) may not only remove all multiple energy but also primary energy. This may especially be the case where multiples overlap with strong primaries in the gathers. On the other hand, a conservative choice of parameters might in some cases not remove enough multiples. An example of an aggressive parameterization is a long filter length. The more filter coefficients there are in Equation (6), the more possibilities there are to remove multiples and, as an undesirable consequence, primaries.

Subtracting the estimated multiples $m_A(w, x_r, x_s)$ from corresponding seismic data $H^{deg}(w, x_r, x_s)$ gives a gather of estimated primaries:

$$\{H_{0,A}(w, x_r, x_s)\} \quad (8)$$

where
  $H_{0,A}(w, x_r, x_s) = (w, x_r, x_s) - m_A(w, x_r, x_s)$.
The estimated primaries $\{H_{0,A}(w, x_r, x_s)\}$ in the gather of Equation (8) may include residual multiples not accounted for in the estimated multiples $\{m_A(w, x_r, x_s)\}$. The residual multiples may be determined using multiple diffraction reduction (MDR). Multiple diffraction reduction is a processing technique aimed at attenuating high-frequency energy reverberations of diffractions. Although MDR was designed to attenuate reverberations of diffractions, it can also attenuate residual multiple energy that has not been properly removed by other techniques (e.g. adaptive subtraction). The technique may separate the high-amplitude diffracted multiple energy from the primary energy. The separation is based on the different frequency, amplitude, and phase characteristics of primaries and multiples. Because multiples typically occur in the higher frequency portion of the estimated primary $H_{0,A}(w, x_r, x_s)$, a threshold frequency denoted by, $w_{th}$, may be selected and used to separate the estimated primary $H_{0,A}(w, x_r, x_s)$ into a low-frequency estimated primary $H_{0,A}(w^-, x_r, x_s)$ and a high-frequency estimated primary $H_{0,A}(w^+, x_r, x_s)$, where $0 \le w_- < w_{th} \le w^+$. The high-frequency estimated primary $H_{0,A}(w^+, x_r, x_s)$ may include residual multiples denoted by $\Delta m(w^+, x_r, x_s)$. MDR may be used to determine a high-frequency estimated primary $H_{0,A}^{MDR}(w^+, x_r, x_s)$ with reduced residual multiples for frequencies above the threshold frequency $w_{th}$. The reduced high-frequency primary $H_{0,A}^{MDR}(w^+, x_r, x_s)$ may be subtracted from the high-frequency primary $H_{0,A}(w^+, x_r, x_s)$ to give the residual multiples:

$$\Delta m(w^+, x_r, x_s) = H_{0,A}(w^+, x_r, x_s) - H_{0,A}^{MDR}(w^+, x_r, x_s) \quad (9)$$

where $w_{th} \le w^+$.

Figure 7:
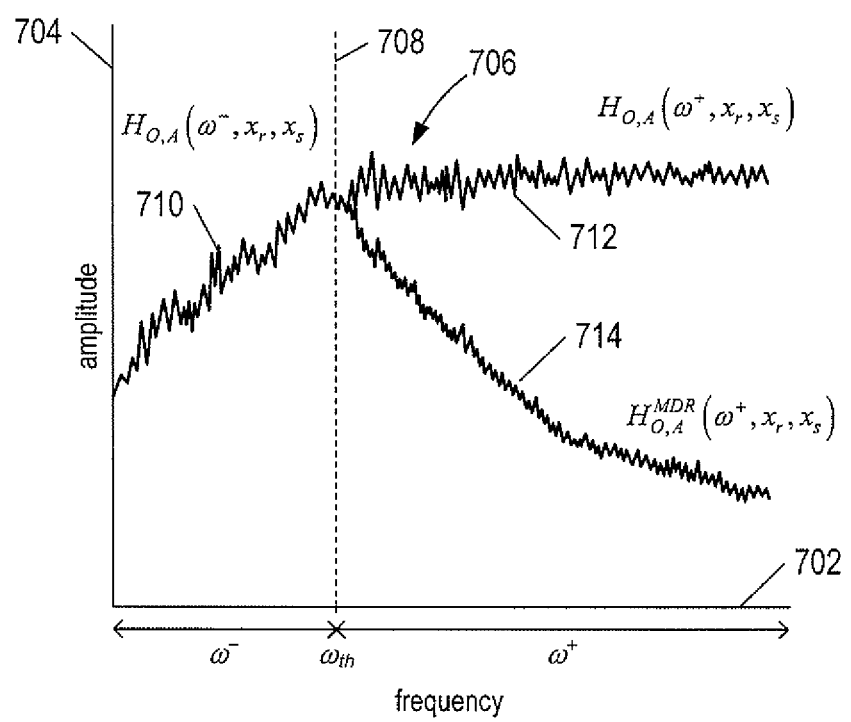
FIG. 7 shows a synthetic frequency spectrum of an estimated primary that includes residual multiples.

FIG. 7 shows a synthetic frequency spectrum of an estimated primary $H_{0,A}(w, x_r, x_s)$ that includes residual multiples. Horizontal axis 702 is the frequency axis and vertical axis 704 is the amplitude. Spiked curve 706 represents the frequency spectrum of an estimated primary $H_{0,A}(w, x_r, x_s)$. In the example of FIG. 7, dashed line 708 corresponds to a threshold frequency $w_{th}$. The low-frequency estimated primary $H_{0,A}(w^-, x_r, x_s)$ is characterized by a portion 710 of the curve 706, and the high-frequency estimated primary $H_{0,A}(w^+, x_r, x_s)$ is characterized by a portion 712 of the curve 706. In the example of FIG. 7, a curve 714 represents a reduced high-frequency estimated primary $H_{0,A}^{MDR}(w^+, x_r, x_s)$ obtained using MDR that corresponds to the high-frequency primary $H_{0,A}(w^+, x_r, x_s)$.

Figure 8:
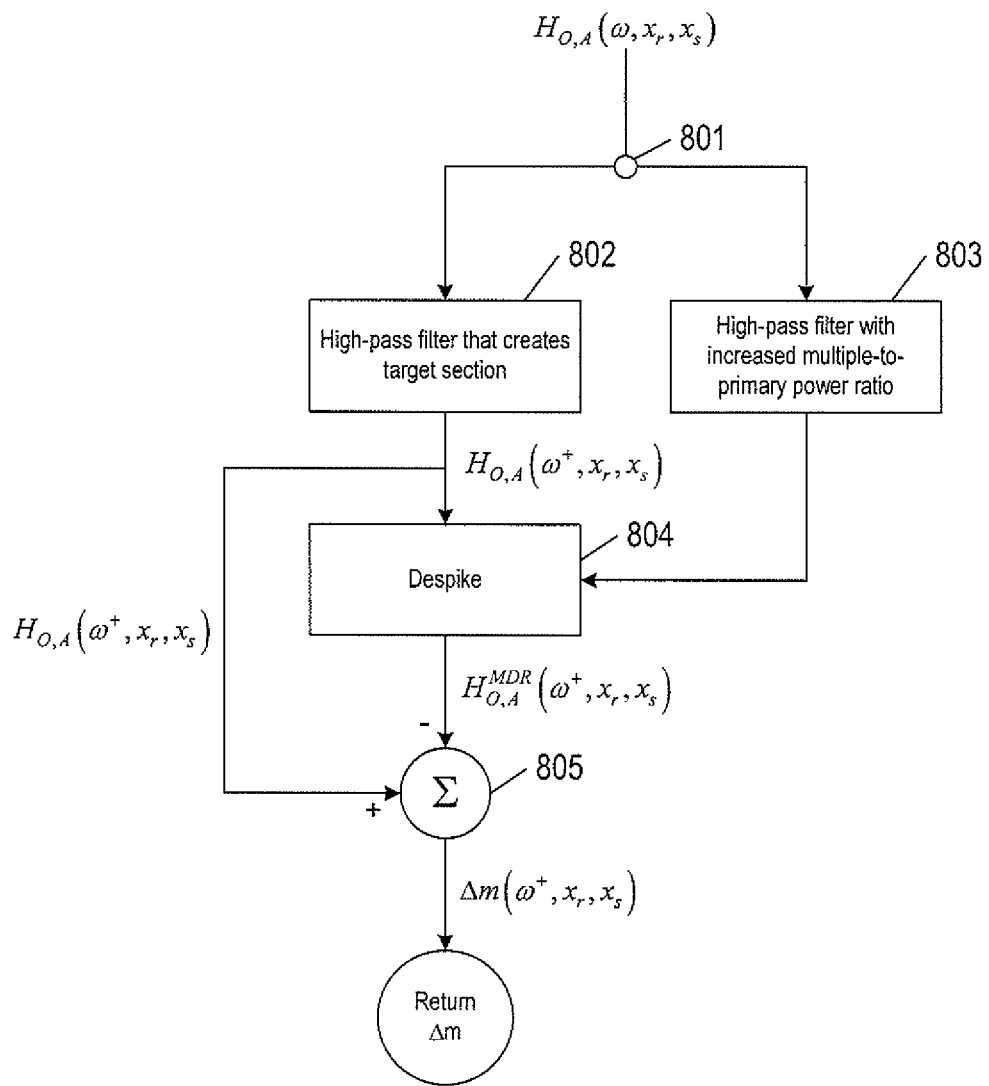
FIG. 8 shows an example flow diagram of a method for multiple diffraction reduction.

FIG. 8 shows an example flow diagram of a method for MDR. At junction 801, an estimated primary $H_{0,A}(w, x_r, x_s)$ of the gather $\{H_{0,A}(w, x_r, x_s)\}$ is input and passed to blocks 802 and 803. In block 802, the estimated primary $H_{0,A}(w, x_r, x_s)$ is input to a first high-pass filter that passes only the high-frequency estimated primary $H_{0,A}(w^+, x_r, x_s)$ to block 804 and summing junction 805. In block 803, the estimated primary $H_{0,A}(w, x_r, x_s)$ is also input to a second high-pass filter that passes only the high-frequency estimated primary $H_{0,A}(w^+, x_r, x_s)$ and increases the diffracted multiple-to-primary power ratio in $H_{0,A}(w^+, x_r, x_s)$ in order to identify the location of high multiple-to-primary power locations in the spectrum. In block 804, the high-frequency estimated primary $H_{0,A}(w^+, x_r, x_s)$ input from block 802 is despiked to give reduced high-frequency estimated primary $H_{0,A}^{MDR}(w^+, x_r, x_s)$, which may be obtained by replacing the noisy samples in the high-frequency estimated primary $H_{0,A}(w^+, x_r, x_s)$ identified in block 803 with interpolated values. Interpolation may be performed with a prediction-error filter in the x-f domain in order to ensure that the high-frequency, large amplitude contents associated with the primaries are not severely attenuated. At summing junction 805, the reduced high-frequency estimated primary $H^{0,A}(w^+, x_r, x_s)$ is subtracted from the high-frequency estimated primary $H_{0,A}(w^+, x_r, x_s)$ to give residual multiples $\Delta m(w^+, x_r, x_s)$. The method for MDR may be applied to each of the estimated primaries in the gather $\{H_{0,A}(w, x_r, x_s)\}$ to give a corresponding set of residual multiples $\{\Delta m(w^+, x_r, x_s)\}$.

The residual multiples in the set $\{\Delta m(w^+, x_r, x_s)\}$ may be combined with the estimated multiples in the set $\{m_A(w, x_r, x_s)\}$ to give a set of corrected multiples $$\{m_{cor}(w, x_r, x_s)\} \quad (10)$$

where $$m_{cor}(w, x_r, x_s) = m_A(w, x_r, x_s) + \Delta m(w^+, x_r, x_s).$$

Inverse fast Fourier transform or inverse Laplace transform may be used to transform the corrected multiples $\{m_{cor}(w, x_r, x_s)\}$ from the x-f domain to corrected multiples $\{m_{cor}(t, x_r, x_s)\}$ in the x-t domain. Adaptive subtraction may then be used to match the predicted surface-related multiples $\{m_{pred}(t, x_r, x_s)\}$ to the corrected multiples $\{m_{cor}(t, x_r, x_s)\}$ resulting in final estimated multiples:

$$\{m_C(t, x_r, x_s)\} \quad (11)$$

Adaptive subtraction in this case is based on a second objective function formulated as a hybrid L2-norm given by:

$$e_2(f) = \sum_{x_s} \sum_{x_r} \|m_{cor}(t, x_r, x_s) - m_{pred}(t, x_r, x_s) * f_2(t)\|_2^2 \quad (12)$$

where $f_2(t)$ is a time-dependent filter with coefficients denoted by $[d_1(t), d_2(t), \ldots, d_m(t)]$ with filter length m.

The filter length m is selected as described above for the first filter to remove multiples energy and avoid removal of primaries energy. The filter $f_2(t)$ is convolved with the predicted surface-related multiples $\{m_{pred}(t, x_r, x_s)\}$ to give the set of final estimated multiples $\{m_C(t, x_r, x_s)\}$ in Equation (11), where each final estimated multiple in the set of final estimated multiples is given by:

$$m_C(t, x_r, x_s) = m_{pred}(t, x_r, x_s) * f_2(t)$$

Note that adaptive subtraction in this case may be accomplished with a more aggressive parameterization (e.g. by using a longer filter length) than the adaptive subtraction used to calculate the set of predicted surface-related multiples given in Equation (6), because there are almost no primaries present in the corrected multiples.

In other implementations, the final estimated multiples $\{m_C(t, x_r, x_s)\}$ may be generated by first transforming the predicted surface-related multiples $\{m_{pred}(t, x_r, x_s)\}$ and the filter $f_2(t)$ from the x-t domain to the x-f domain using either a fast-Fourier transform or a Laplace transform followed by multiplication in the x-f domain (i.e., $m_C(w, x_r, x_s) = m_{pred}(w, x_r, x_s) \cdot f_2(w)$) and then inverse transforming $\{m_C(w, x_r, x_s)\}$ back to the x-t domain to obtain $\{m_C(t, x_r, x_s)\}$.

The final estimated multiples $\{m_C(t, x_r, x_s)\}$ are subtracted from the corresponding traces in the original gather of deghosted seismic data $\{h^{deg}(t, x_r, x_s)\}$ in order to obtain final estimated primaries:

$$\{h_{0,C}(t, x_r, x_s)\} \quad (13)$$

where $$h_{0,C}(t, x_r, x_s) = h^{deg}(t, x_r, x_s) - m_C(t, x_r, x_s).$$

It should be noted that methods for generating the gather of multiple attenuated primaries represented by Equation (13) are not intended to be limited to executing the mathematical operations described above in the x-f domain. In other implementations, the mathematical operations described above may be executed in the x-t domain by replacing the multiplication operation denoted by "·" in the equations above with mathematical convolution denoted by "*".

Figure 9:
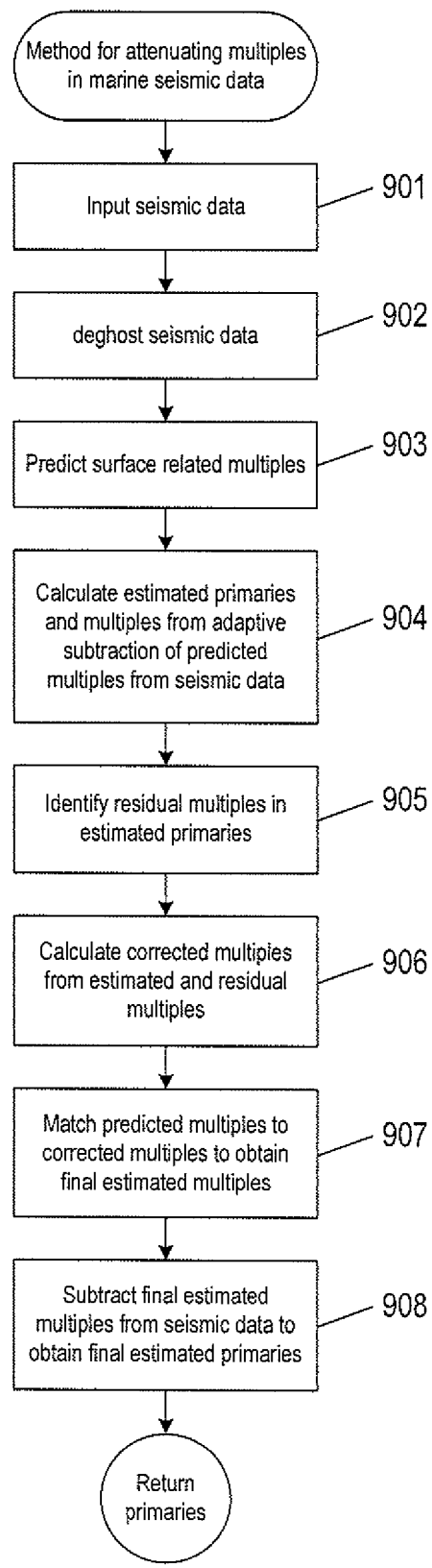
FIG. 9 shows a flow diagram of a method for attenuating multiples in a gather of seismic data.

FIG. 9 shows a flow diagram of a computational method for attenuating multiples in a gather of seismic data. In block 901, a gather of seismic data is input. The gather may be in the x-t domain as represented by the gather in Equation (1)

or the gather may have been transformed to the x-f domain as represented by the gather in Equation (2). In block 902, the seismic data is deghosted to generate deghosted seismic data as described above with reference to Equation (3). In block 903, predicted surface-related multiples $\{m_{pred}\}$ may be calculated as described above with reference to Equations (4). In block 904, adaptive subtraction may be used to calculate estimated multiples $\{m_A\}$ represented by Equation (7), as described above with reference to Equations (6). The estimated multiples $\{m_A\}$ are used to calculate estimated primaries as described above with reference to Equation (8). In block 905, MDR may be used to calculate residual multiples $\{\Delta m\}$ in the estimated primaries, as described above with reference to Equation (9) and FIGS. 7 and 8. The estimated multiples $\{m_A\}$ calculated in block 904 and the residual multiples $\{\Delta m\}$ calculated in block 905 are combined in block 907 to give corrected multiples $\{m_{cor}\}$ represented in Equation (10) above. In block 908, corrected multiples $\{m_{cor}\}$ obtained in block 905 may be matched with the predicted surface-related multiples $\{m_{pred}\}$ calculated in block 903 using adaptive subtraction to give final estimated multiples $\{m_C\}$ as described above with reference to Equations (11) and (12). In block 908, the final estimated multiples $\{m_C\}$ may be subtracted from the deghosted seismic data in order to obtain to final estimated primaries given in Equation (13).

Figure 10C:
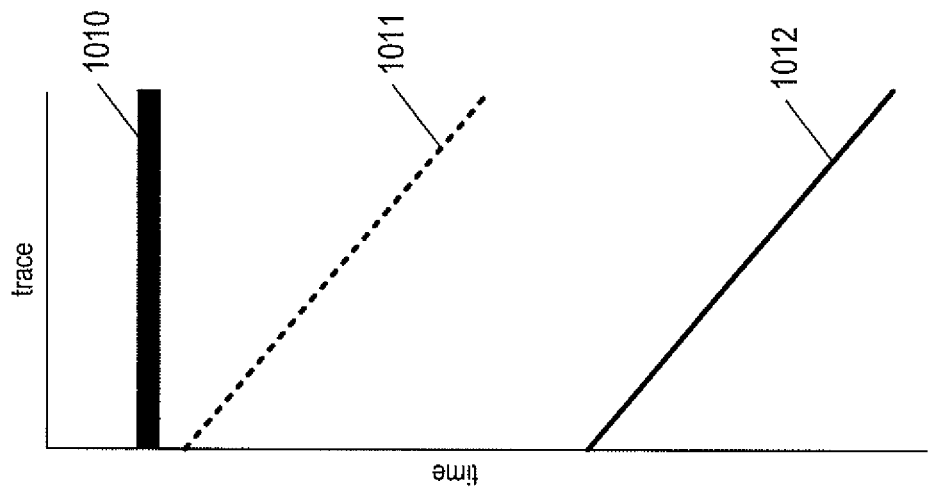
FIGS. 10A-10F show an example series of synthetic gathers that illustrate various operations for attenuating multiples in a gather of seismic data.
Figure 10B:
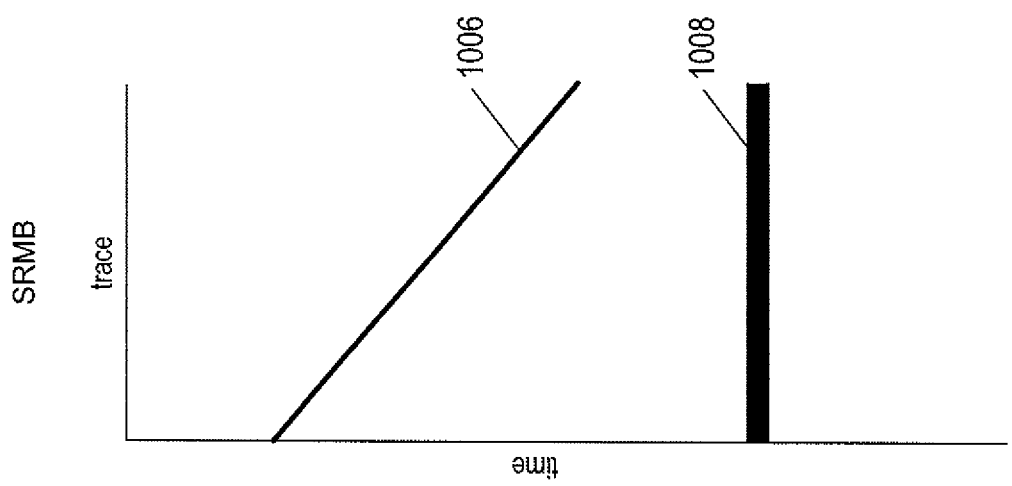
Figure 10A:
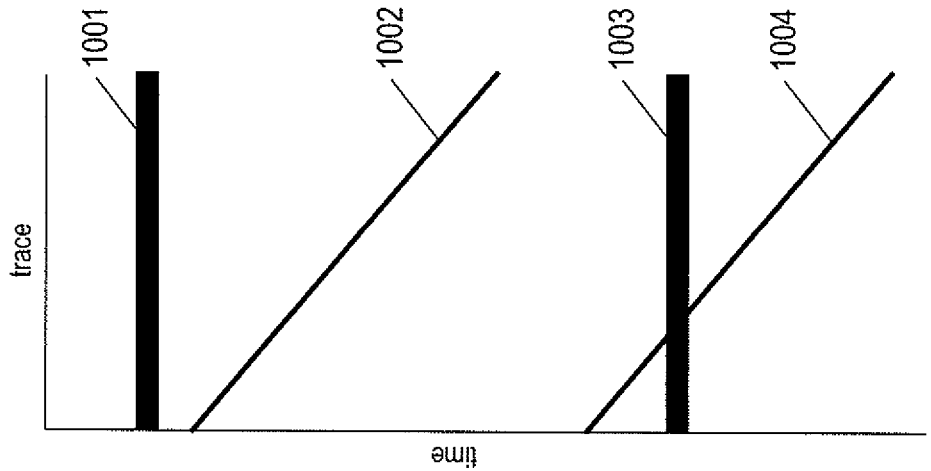
Figure 10F:
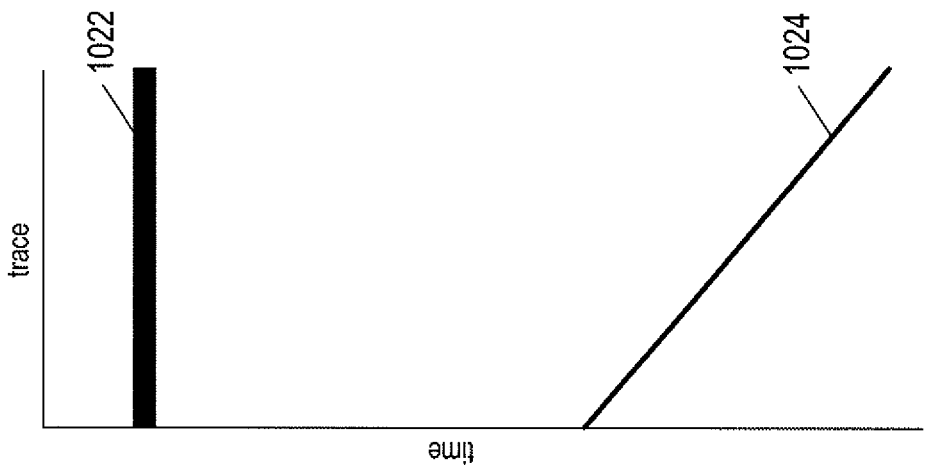
Figure 10E:
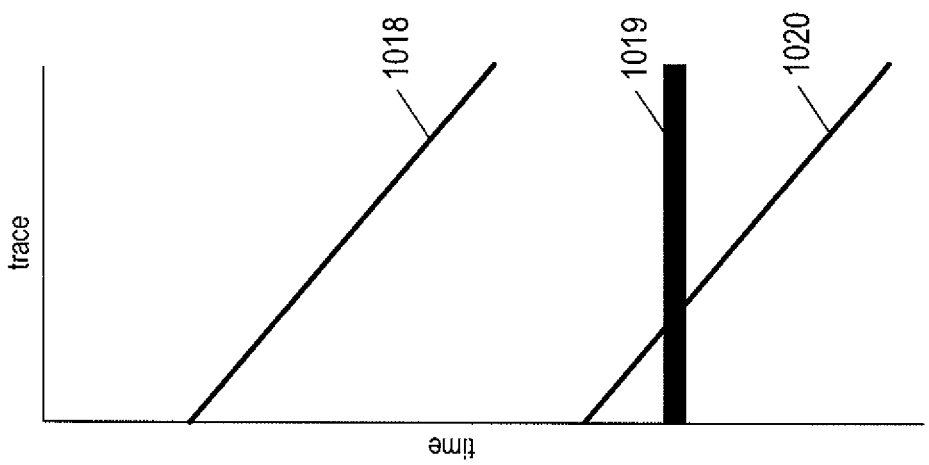
Figure 10D:
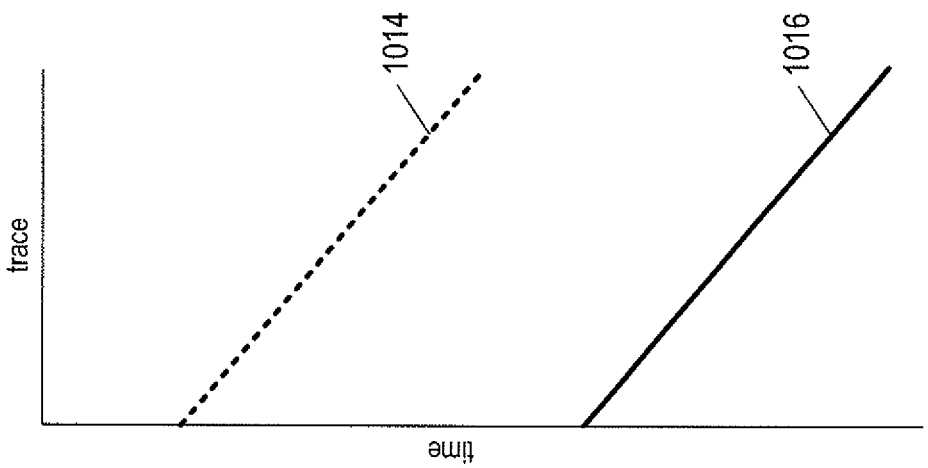

FIGS. 10A-10F show an example series of space-time domain synthetic gathers that illustrate various operations in implementing the methods described above for attenuating multiples in a gather of seismic data. FIG. 10A shows a synthetic gather of seismic data $\{h\}$ composed of four reflected waves 1001-1004. The gather shown in FIG. 10B is of predicted surface-related multiples $\{m_{pred}\}$ obtained from the gather shown in FIG. 10A. Reflected waves 1006 and 1008 are predicted surface-related multiples that correspond to the reflected waves 1002 and 1003 in the gather of FIG. 10A. It should be noted that dipping reflected wave 1006 is shifted slightly with respect to corresponding reflected wave 1002 in FIG. 10A creating a mismatch between the reflected wave 1002 in FIG. 10A and reflected wave 1006 in FIG. 10B. Adaptive subtraction applied to the gathers shown in FIGS. 10A and 10B as described above, may produce a gather shown in FIG. 10C. This gather may include estimated primaries $\{h_{o,A}\}$ represented by reflected waves 1010 and 1012 that correspond to reflected waves 1001 and 1004 in FIG. 10A, and a residual multiple $\{\Delta m\}$ represented by a reflected wave 1011, which results from the mismatch between the reflected waves 1002 and 1006. MDR applied to the gather in FIG. 10C may produce a gather in FIG. 10D, which includes a residual multiple represented by reflected wave 1014 that corresponds to the residual multiple 1011, and a primary represented by reflected wave 1016 that corresponds to primary reflected wave 1012 in FIG. 10C. Note that the multiple refraction reduction has erroneously marked wave 1016 as a multiple. The gather in FIG. 10B of predicted surface-related multiples $\{m_{pred}\}$ may be summed with the gather in FIG. 10D of residual multiple $\{\Delta m\}$ to give the gather shown in FIG. 10E of corrected multiples $\{m_{cor}\}$ composed of reflected waves 1018-1020. The corrected multiples $\{m_{cor}\}$ represented by reflected waves 1018-1020 may be matched to the predicted surface-reflected multiples $\{m_{pred}\}$ represented by reflected waves 1006 and 1008 in FIG. 10B using adaptive subtraction to obtain final estimated multiples $\{m_C\}$ that correspond to the reflected waves 1018 and 1019. The final estimated multiples $\{m_C\}$ represented by reflected waves 1018 and 1019 may be subtracted from deghosted input gather in FIG. 10A to give a gather of final estimated primaries $\{h_{o,C}\}$ shown in FIG. 10F, which is composed of final estimated primary reflected waves 1022 and 1024 that correspond to reflected waves 1001 and 1004 in FIG. 10A.

Implementations are not intended to be limited to SRME and MDR described above. In other implementations, surface-related multiples may be predicted using predictive deconvolution and wavefield extrapolation. Also, residual multiples may calculated using Radon filtering.

Figure 11:
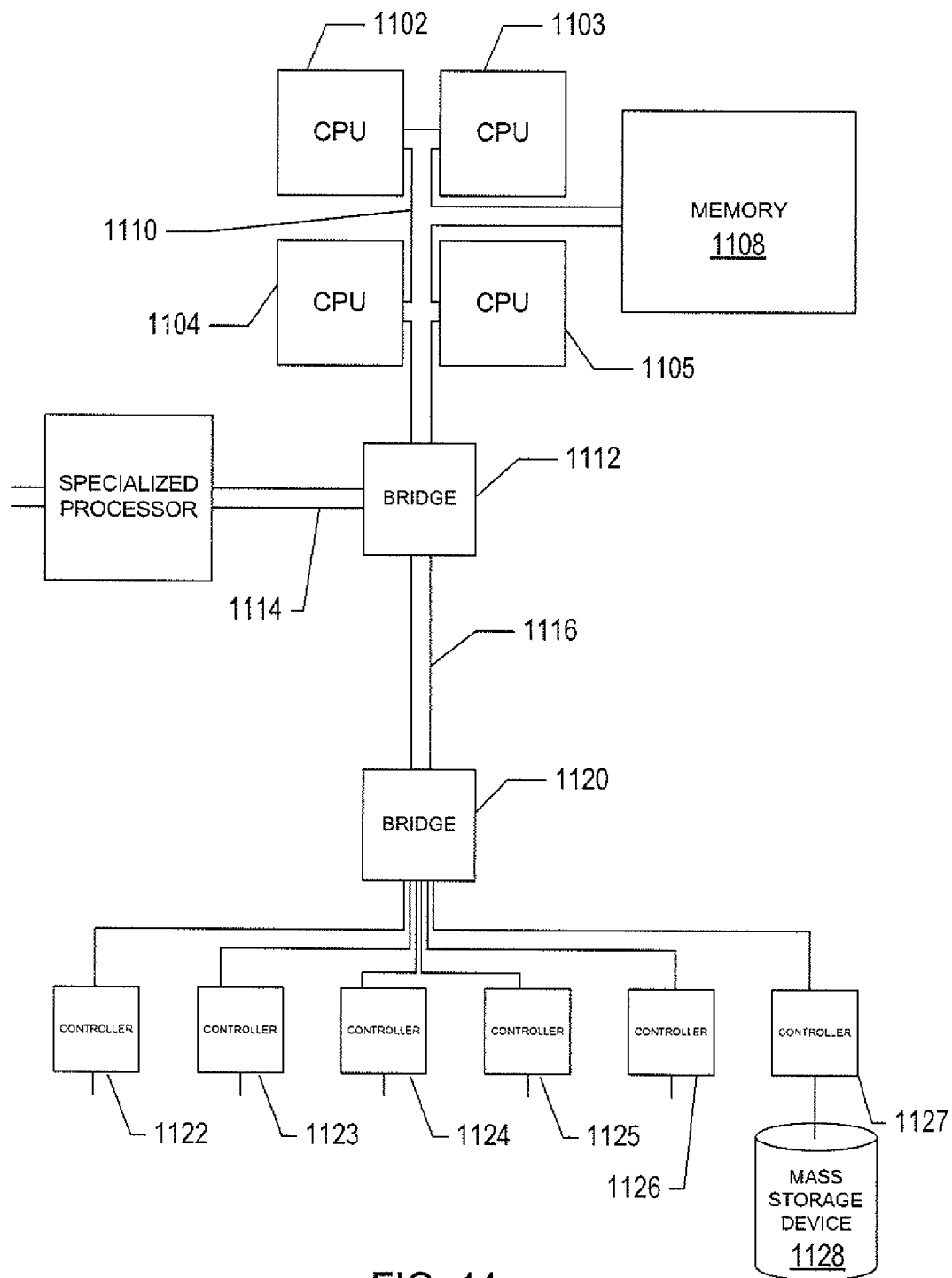
FIG. 11 shows an example of a generalized computer system that executes efficient methods for attenuating multiples in seismic data.

FIG. 11 shows an example of a generalized computer system that executes efficient methods for attenuating multiples in seismic data and therefore represents a geophysical-analysis data-processing system. The internal components of many small, mid-sized, and large computer systems as well as specialized processor-based storage systems can be described with respect to this generalized architecture, although each particular system may feature many additional components, subsystems, and similar, parallel systems with architectures similar to this generalized architecture. The computer system contains one or multiple central processing units ("CPUs") 1102-1105, one or more electronic memories 1108 interconnected with the CPUs by a CPU/memory-subsystem bus 1110 or multiple busses, a first bridge 1112 that interconnects the CPU/memory-subsystem bus 1110 with additional busses 1114 and 1116, or other types of high-speed interconnection media, including multiple, high-speed serial interconnects. The busses or serial interconnections, in turn, connect the CPUs and memory with specialized processors, such as a graphics processor 1118, and with one or more additional bridges 1120, which are interconnected with high-speed serial links or with multiple controllers 1122-1127, such as controller 1127, that provide access to various different types of non-volatile computer-readable media, such as computer-readable medium 1128, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 1128 may be a data-storage device, including electronic memory, optical or magnetic disk drive, USB drive, flash memory and other such data-storage device. The computer-readable medium 1128 can be used to store machine-readable instructions that encode the computational methods described above and can be used to store encoded data, during store operations, and from which encoded data can be retrieved, during read operations, by computer systems, data-storage systems, and peripheral devices.

The method described above for attenuating multiples in seismic data may be implemented in real time on board a survey vessel while a survey is being conducted. For example, an initial gather may be generated for a shot location of a sail line. When the survey vessel activates the source at a subsequent shot location, gathers for the previous shot location may be generated and the methods described above may be applied to the gather in order to attenuate multiples.

In accordance with an embodiment described above, the seismic data with multiples attenuated, for example the gather of final estimated primaries as described above, may form a geophysical data product indicative of certain properties of a subterranean formation. The geophysical data product may include processed seismic data and may be stored on a physical computer-readable medium as described above. The geophysical data product may be produced offshore (i.e. by equipment on survey vessel 102) or onshore (i.e. at a computing facility on land) either within the United States or in another country. When the geophysical data product is produced offshore or in another country, it may be imported onshore to a data-storage facility in the United States. Once onshore in the United States, geophysical analysis may be performed on the data product.

Although the above disclosure has been described in terms of particular embodiments, it is not intended that the disclosure be limited to these embodiments. Modifications within the spirit of the disclosure will be apparent to those skilled in the art. For example, any of a variety of different implementations of noise attenuation can be obtained by varying any of many different design and development parameters, including programming language, underlying operating system, modular organization, control structures, data structures, and other such design and development parameters. Although implementations are described above for marine surveys with towed sources and streamers, implementations are not intended to be limited to such marine surveys. The computational systems and methods described above for attenuating noise may also be applied to seismic data produced by ocean bottom seismic techniques. One example of these techniques is implemented with ocean bottom cables ("OBCs"). The OBCs are similar to the towed streamer cables described above in that the OBCs include a number of spaced-apart receivers, such as receivers deployed approximately every 25 to 50 meters, but the OBCs are laid on or near the surface 124 shown in FIG. 1A. The OBCs may be electronically connected to an anchored survey vessel that provides power, instrument command and control, and data telemetry of the sensor data to the recording equipment on board the survey vessel. Alternatively, ocean bottom seismic techniques can be implemented with autonomous systems composed of receivers that are deployed and recovered using remote operated vehicles. The receivers may be placed on or near the surface 124 in a fairly coarse grid, such as approximately 400 meters apart. Autonomous receiver systems are typically implemented using one of two types of receiver systems. A first receiver system is a cable system in which the receivers are connected by cables to each other and are connected to an anchored survey vessel. The cabled systems have power supplied to each receiver along a cable, and seismic data are returned to the survey vessel along the cable or using radio telemetry. A second receiver system uses self-contained receivers that have a limited power supply, but the receivers typically have to be retrieved in order to download recorded seismic data. Whether using OBCs or autonomous receivers, survey vessels equipped with two or more sources are operated as described above with reference to FIGS. 1A and 1B to generate acoustic impulses at substantially the same shot location. It should also be note that implementations are not intended to be limited to marine surveys. The computational methods and systems described above for attenuating noise is seismic may be applied to land-based surveys. For a land based survey, the sources and receivers are disposed on land and the sources may be repeatedly activated at approximately the same location with time delays as described above for the marine survey.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. In a process for generating an image of a subterranean formation using a recorded gather of seismic data generated by sensors in a marine seismic survey in response to activating a source towed by a survey vessel, primary acoustic reflections from the subterranean formation and multiple acoustic reflections between the subterranean formation and a free surface are captured in the recorded gather, the specific improvement consisting of:
   calculating predicted surface-related multiples in the recorded gather;
   determining time-dependent shaping-filter coefficients that minimize an objective function of the predicted surface-related multiples and the seismic data;
   calculating estimated primaries and estimated multiples based on the time-dependent shaping-filter coefficients and the predicted surface-related multiples;
   filtering the estimated primaries to determine residual multiples in the estimated primaries;
   calculating final estimated multiples based on the residual multiples and the estimated multiples;
   subtracting the final estimated multiples from the seismic data to generate a new recorded gather of final estimated primaries with attenuated multiples; and
   using the new gather of final estimated primaries with attenuated multiples in generating an image of the subterranean formation, thereby the image reveals structural information about the subterranean formation without contamination from the multiples.

2. The process of claim 1, wherein calculating the predicted surface-related multiples further comprises iteratively calculating an estimate of the primary wavefield as a function of the seismic data in the gather, predicted surface-related multiples, and a matching filter.

3. The process of claim 1, further comprising deghosting the seismic data.

4. The process of claim 1, wherein calculating estimated primaries and estimated multiples further comprises:
   combining the shaping-filter coefficients with the predicted surface-related multiples to generate the estimated multiples; and
   subtracting the estimated multiples from the gather to generate the estimated primaries.

5. The process of claim 1, wherein filtering the estimated primaries to determine the residual multiples in the estimated primaries further comprises
   passing the estimating primaries through a first high-pass filter to generate a first high-frequency estimated primary;
   passing the estimated primaries through a second high-pass filter to increase diffracted multiple-to-primary power ratio and identify high multiple-to-primary power locations in a spectrum of the high-frequency estimated primary;
   despiking the first high-frequency estimated primary based on identified high multiple-to-primary locations to generate reduced high-frequency estimate primaries; and
   subtracting the reduced high-frequency estimate primaries from the estimated primaries to generate the residual multiples.

6. The process of claim 1, wherein calculating the final estimated multiples further comprises:
adding the residual multiples to the estimated multiples to generate corrected multiples; and
minimizing an objective function of the predicted surface-related multiples and the corrected multiples to generate the final estimated multiples.

7. The process of claim 1, further comprises storing the primaries with attenuated multiples in one or more data-storage devices.

8. The process of claim 1, further comprising processing the gather of final estimated primaries with attenuated multiples to generate a geophysical data product.

9. The process of claim 8, further comprising storing the geophysical data product in a non-transitory computer-readable medium suitable for importing onshore.

10. The process of claim 9, further comprising performing geophysical analysis onshore on the geophysical data product.

11. A computer system for generating an image of a subterranean formation using a recorded gather of seismic data generated by sensors in a marine survey of a subterranean formation, the system comprising:
one or more processors;
one or more data-storage devices; and
a routine stored in one or more of the one or more data-storage devices that when executed by the one or more processors performs
calculating predicted surface-related multiples in the recorded gather;
determining time-dependent shaping-filter coefficients that minimize an objective function of the predicted surface-related multiples and the seismic data;
calculating estimated primaries and estimated multiples based on the time-dependent shaping-filter coefficients and the predicted surface-related multiples;
filtering the estimated primaries to determine residual multiples in the estimated primaries;
calculating final estimated multiples based on the residual multiples and the estimated multiples;
subtracting the final estimated multiples from the seismic data to generate a new recorded gather of final estimated primaries with attenuated multiples; and
using the new gather of final estimated primaries with attenuated multiples in generating an image of the subterranean formation, the image revealing structural information about the subterranean formation without contamination from the multiples.

12. The computer system of claim 11, wherein calculating the predicted surface-related multiples further comprises iteratively calculating an estimate of the primary wavefield as a function of the seismic data in the gather, predicted surface-related multiples, and a matching filter.

13. The computer system of claim 11 further comprising deghosting the seismic data.

14. The computer system of claim 11, wherein calculating estimated primaries and estimated multiples further comprises:
combining the shaping-filter coefficients with the predicted surface-related multiples to generate the estimated multiples; and
subtracting the estimated multiples from the gather to generate the estimated primaries.

15. The computer system of claim 11, wherein filtering the estimated primaries to determine the residual multiples in the estimated primaries further comprises passing the estimating primaries through a first high-pass filter to generate a first high-frequency estimated primary;
passing the estimated primaries through a second high-pass filter to increase diffracted multiple-to-primary power ratio and identify high multiple-to-primary power locations in a spectrum of the high-frequency estimated primary;
despiking the first high-frequency estimated primary based on identified high multiple-to-primary locations to generate reduced high-frequency estimate primaries; and
subtracting the reduced high-frequency estimate primaries from the estimated primaries to generate the residual multiples.

16. The computer system of claim 11, wherein calculating the final estimated multiples further comprises:
adding the residual multiples to the estimated multiples to generate corrected multiples; and
minimizing an objective function of the predicted surface-related multiples and the corrected multiples to generate the final estimated multiples.

17. The computer system of claim 11, further comprises storing the primaries with attenuated multiples in one or more data-storage devices.

18. The computer system of claim 11, further comprising processing the gather of final estimated primaries with attenuated multiples to generate a geophysical data product.

19. The computer system of claim 18, further comprising storing the geophysical data product on a tangible, non-volatile computer-readable medium suitable for importing onshore.

20. The computer system of claim 19, further comprising performing geophysical analysis onshore on the geophysical data product.

21. A non-transitory computer-readable medium having machine-readable instructions encoded thereon for enabling one or more processors of a computer system to perform the operations of
calculating predicted surface-related multiples in a recorded gather of seismic data generated by sensors in a marine survey of a subterranean formation;
determining time-dependent shaping-filter coefficients that minimize an objective function of the predicted surface-related multiples and the seismic data;
calculating estimated primaries and estimated multiples based on the time-dependent shaping-filter coefficients and the predicted surface-related multiples;
filtering the estimated primaries to determine residual multiples in the estimated primaries;
calculating final estimated multiples based on the residual multiples and the estimated multiples;
subtracting the final estimated multiples from the seismic data to generate a gather of final estimated primaries with attenuated multiples; and
using the new gather of final estimated primaries with attenuated multiples in generating an image of the subterranean formation, the image revealing structural information about the subterranean formation without contamination from the multiples.

22. The medium of claim 21, wherein calculating the predicted surface-related multiples further comprises iteratively calculating an estimate of the primary wavefield as a function of the seismic data in the gather, predicted surface-related multiple, and a matching filter.

23. The medium of claim 21 further comprising deghosting the seismic data.

24. The medium of claim 21, wherein calculating estimated primaries and estimated multiples further comprises:
   combining the shaping-filter coefficients with the predicted surface-related multiples to generate the estimated multiples; and
   subtracting the estimated multiples from the gather to generate the estimated primaries.

25. The medium of claim 21, wherein filtering the estimated primaries to determine the residual multiples in the estimated primaries further comprises
   passing the estimating primaries through a first high-pass filter to generate a first high-frequency estimated primary;
   passing the estimated primaries through a second high-pass filter to increase diffracted multiple-to-primary power ratio and identify high multiple-to-primary power locations in a spectrum of the high-frequency estimated primary;
   despiking the first high-frequency estimated primary based on identified high multiple-to-primary locations to generate reduced high-frequency estimate primaries; and
   subtracting the reduced high-frequency estimate primaries from the estimated primaries to generate the residual multiples.

26. The medium of claim 21, wherein determining the calculated approximate multiples further comprises:
   adding the residual multiples to the estimated multiples to generate corrected multiples; and
   matching the corrected multiples to the predicted surface-related multiples to generate the final estimated multiples using adaptive subtraction.

27. The medium of claim 21, further comprises storing the primaries with attenuated multiples in one or more data-storage devices.

28. The medium of claim 21, further comprising processing the gather of final estimated primaries with attenuated multiples to generate a geophysical data product.

29. The medium of claim 28, further comprising storing the geophysical data product on a tangible, non-volatile computer-readable medium suitable for importing onshore.

30. The previously presented medium of claim 29, further comprising performing geophysical analysis onshore on the geophysical data product.

* * * * *